US008898795B2

(12) United States Patent
Smith

(10) Patent No.: US 8,898,795 B2
(45) Date of Patent: Nov. 25, 2014

(54) BRIDGE FOR COMMUNICATING WITH A DYNAMIC COMPUTER NETWORK

(75) Inventor: Wayne Smith, Melbourne Beach, FL (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/369,442

(22) Filed: Feb. 9, 2012

(65) Prior Publication Data

US 2013/0212687 A1  Aug. 15, 2013

(51) Int. Cl.
| | | |
|---|---|---|
| G06F 7/04 | (2006.01) |
| G06F 17/30 | (2006.01) |
| H04N 7/16 | (2011.01) |
| G06F 21/60 | (2013.01) |
| H04L 29/06 | (2006.01) |

(52) U.S. Cl.
CPC ............. *H04L 63/04* (2013.01); *G06F 21/606* (2013.01)
USPC ......................................................... 726/26

(58) Field of Classification Search
CPC .............................. H04L 62/04; G06F 21/606
USPC .......................................................... 726/26
See application file for complete search history.

(56) References Cited

U.S. PATENT DOCUMENTS

| | | | |
|---|---|---|---|
| 5,734,649 A | 3/1998 | Carvey et al. |
| 6,052,064 A | 4/2000 | Budnik et al. |
| 6,646,989 B1 * | 11/2003 | Khotimsky et al. ........... 370/238 |
| 6,917,974 B1 | 7/2005 | Stytz et al. |
| 6,981,146 B1 | 12/2005 | Sheymov |
| 7,010,604 B1 | 3/2006 | Munger et al. |
| 7,043,633 B1 | 5/2006 | Fink et al. |
| 7,085,267 B2 * | 8/2006 | Carey et al. .................... 370/389 |
| 7,133,930 B2 | 11/2006 | Munger et al. |
| 7,216,359 B2 | 5/2007 | Katz et al. |
| 7,236,598 B2 | 6/2007 | Sheymov et al. |
| 7,382,778 B2 | 6/2008 | Chari et al. |
| 7,469,279 B1 | 12/2008 | Stamler et al. |

(Continued)

FOREIGN PATENT DOCUMENTS

JP            2008177714 A          7/2008

OTHER PUBLICATIONS

Shi, L., et al., "Full Service Hopping for Proactive Cyber-Defense", International Conference on Networking, Sensing and Control, 2008. ICNSC 2008, IEEE, Apr. 6-8, 2008.

(Continued)

*Primary Examiner* — Christopher Revak
*Assistant Examiner* — Jason C Chiang
(74) *Attorney, Agent, or Firm* — Fox Rothschild LLP; Robert J Sacco, Esq.

(57) ABSTRACT

Method for communicating data in a computer network involves dynamically modifying at a first location in the computer network a plurality of true values. The true values correctly represent the plurality of identify parameters. These true values are transformed to false values, which incorrectly represent the identity parameters. Subsequently, the identity parameters are modified at a second location to transform the false values back to the true values. The position of the first and/or second locations varies dynamically as part of this process. A bridge transforms identity parameter values when communicating outside the network. Dynamic modification of the identity parameters occurs in accordance with a mission plan that can be modified without interrupting communication of data in the network.

25 Claims, 13 Drawing Sheets

(56) References Cited

U.S. PATENT DOCUMENTS

| | | | |
|---|---|---|---|
| 7,712,130 B2 | 5/2010 | Reamer | |
| 7,739,497 B1* | 6/2010 | Fink et al. | 713/162 |
| 7,756,140 B2* | 7/2010 | Matoba | 370/395.54 |
| 7,757,272 B1 | 7/2010 | Dean | |
| 7,787,476 B2* | 8/2010 | Shimizu et al. | 370/401 |
| 7,895,348 B2 | 2/2011 | Twitchell, Jr. | |
| 7,958,556 B2 | 6/2011 | Roesch et al. | |
| 7,996,894 B1* | 8/2011 | Chen et al. | 726/22 |
| 8,139,504 B2* | 3/2012 | Mankins et al. | 370/254 |
| 8,199,677 B1* | 6/2012 | Amis et al. | 370/255 |
| 8,464,334 B1 | 6/2013 | Singhal | |
| 8,572,717 B2 | 10/2013 | Narayanaswamy | |
| 2002/0010799 A1* | 1/2002 | Kubota et al. | 709/249 |
| 2002/0161884 A1* | 10/2002 | Munger et al. | 709/224 |
| 2002/0161905 A1* | 10/2002 | Haverinen et al. | 709/229 |
| 2003/0149783 A1 | 8/2003 | McDaniel | |
| 2004/0103205 A1 | 5/2004 | Larson et al. | |
| 2004/0255167 A1 | 12/2004 | Knight | |
| 2005/0038708 A1 | 2/2005 | Wu | |
| 2005/0235044 A1 | 10/2005 | Tazuma | |
| 2006/0121418 A1 | 6/2006 | DeMarco et al. | |
| 2007/0058540 A1 | 3/2007 | Kay | |
| 2007/0073838 A1 | 3/2007 | Shizuno | |
| 2007/0081541 A1* | 4/2007 | Umekage et al. | 370/395.2 |
| 2007/0261112 A1 | 11/2007 | Todd et al. | |
| 2008/0056487 A1 | 3/2008 | Akyol et al. | |
| 2008/0140847 A1 | 6/2008 | Almog | |
| 2008/0159128 A1 | 7/2008 | Shaffer et al. | |
| 2008/0172739 A1 | 7/2008 | Nakae et al. | |
| 2008/0205399 A1* | 8/2008 | Delesalle et al. | 370/392 |
| 2008/0222734 A1* | 9/2008 | Redlich et al. | 726/26 |
| 2008/0235755 A1 | 9/2008 | Blaisdell et al. | |
| 2008/0313348 A1 | 12/2008 | Morris et al. | |
| 2009/0031042 A1 | 1/2009 | Phatak | |
| 2009/0059788 A1 | 3/2009 | Granovsky et al. | |
| 2009/0106439 A1 | 4/2009 | Twitchell, Jr. | |
| 2009/0165116 A1 | 6/2009 | Morris | |
| 2010/0009758 A1 | 1/2010 | Twitchell, Jr. | |
| 2010/0229241 A1* | 9/2010 | Liu et al. | 726/26 |
| 2010/0246823 A1 | 9/2010 | Xiao et al. | |
| 2010/0274923 A1* | 10/2010 | Dean | 709/238 |
| 2010/0322391 A1 | 12/2010 | Michaelis et al. | |
| 2010/0333188 A1 | 12/2010 | Politowicz | |
| 2011/0016210 A1 | 1/2011 | Underwood | |
| 2011/0179136 A1 | 7/2011 | Twitchell, Jr. | |
| 2011/0277032 A1 | 11/2011 | Vargas | |
| 2012/0117376 A1* | 5/2012 | Fink et al. | 713/153 |
| 2012/0201138 A1 | 8/2012 | Yu et al. | |
| 2012/0303616 A1* | 11/2012 | Abuelsaad et al. | 707/736 |
| 2013/0104228 A1 | 4/2013 | Burnham et al. | |

OTHER PUBLICATIONS

Kewley, D., et al., "Dynamic Approaches to Thwart Adversary Intelligence Gathering," pp. 176-185, 0/7695-1212-7/01 2001 IEEE.

Beraud, P., et al., "Cyber Defense Network Maneuver Commander", 978-1-4244-7402-8/10 2010 IEEE.

Levin, D., "Lessons Learned in Using Live Red Teams in IA Experiments", Retrieved from the Internet <URL:http://www.bbn.com/resources/pdf/RedTeamExptsPaper-Levin10-02.pdf>>, [retrieved on Apr. 9, 2012].

Information about Related Patents and Patent Applications, see section 6 of the accompanying Information Disclosure Statement Letter, which concerns Related Patents and Patent Applications. May 4, 2012.

Kewley et al., Dynamic Approach to thwart adversary intelligence gathering, 2001, IEEE, 176-185 vol. 1.

Michalski, John., et al., "Final Report for the Network Security Mechanisms Utilizing Network Address Translation LDRD Project (SAND2002-3613)" (Nov. 2002) Retrieved from the Internet: URL:http://prod.sandia.gov/techlib/access-control.cgi/2002/023613.pdf [retrieved on Apr. 19, 2013].

International Search Report mailed Apr. 29, 2013, Application Serial No. PCT/US2013/023700 in the name of Harris Corporation.

Atighetchi, M., et al, "Adaptive Use of Network-Centric Mechanism in Cyber-Defense", Proc. 6th IEEE International Symp. Object-Oriented Real-Time Distributed Computing, IEEE CS Press, 2003, p. 183-192.

Repik, K.A. "Defeating Adversary Network Intelligence Efforts With Active Cyber Defense Techniques", Degree of Master of Cyber Warfare, Jun. 1, 2008, XP55004366, Retrieved from the Internet: URL:<http://www.dtic.mil/cgi-bin/GetTRDoc?A> D=ADA488411&Location=U2&doc=GetTRDoc.pdf [retrieved on Aug. 9, 2011].

International Search Report mailed Mar. 3, 2014, Application Serial No. PCT/SUS2013/038557 in the name of Harris Corporation.

Information about Related Patents and Patent Applications, see section 6 of the accompanying Information Disclosure Statement Letter, which concerns Related Patents and Patent Application.

Masking Networks, Inc. "MS-200 Network Masking Capabilities", Jun. 2010.

Zhao, C., Jia, C., & Lin, K. (Oct. 2010). Technique and Application of End-Hopping in Network Defense. In Cryptography and Network Security, Data Mining and Knowledge Discovery, E-Commerce & Its Applications and Embedded Systems (CDEE), 2010 First ACIS International Symposium on (pp. 266-270). IEEE.

* cited by examiner

| Identity Parameter | Description | Technique |
|---|---|---|
| IP Address | 32 bit number, Class C 254 Addresses | IP Header Manipulation Packet Data Manipulation |
| MAC Address | 6 Bytes - 281,474,976,710,656 Addresses First 3 Bytes - (OUI), Last 3 Bytes – NIC Specific | Ethernet Header Manipulation |
| Net/Subnet | Class A, B, or C Addresses | Cross Stream Fragmentation |
| TCP Sequence # | Make TCP Sequence numbers random. | TCP Header Manipulation |
| Port | 1 - 65,535 (ex. 2957) | TCP Header Manipulation |

FIG. 13

BRIDGE FOR COMMUNICATING WITH A DYNAMIC COMPUTER NETWORK

BACKGROUND OF THE INVENTION

1. Statement of the Technical Field

The inventive arrangements relate to computer network security, and more particularly to systems for communicating between two or more networks where at least one of the networks is dynamically maneuverable to defend against malicious attacks.

2. Description of the Related Art

The central weakness of current cyber infrastructure is its static nature. Assets receive permanent or infrequently-changing identifications, allowing adversaries nearly unlimited time to probe networks, map and exploit vulnerabilities. Additionally, data traveling between these fixed entities can be captured and attributed. The current approach to cyber security places technologies such as firewalls and intrusion detection systems around fixed assets, and uses encryption to protect data en route. However, this traditional approach is fundamentally flawed because it provides a fixed target for attackers. In today's globally connected communications infrastructure, static networks are vulnerable networks.

The Defense Advanced Research Projects Agency (DARPA) Information Assurance (IA) Program has performed initial research in the area of dynamic network defense. A technique was developed under the Information Assurance Program to dynamically reassign Internet protocol (IP) address space feeding into a pre-designated network enclave for the purpose of confusing any would-be adversaries observing the network. This technique is called dynamic network address transformation (DYNAT). An overview of the DYNAT technology was presented in a published paper by DARPA entitled Dynamic Approaches to Thwart Adversary Intelligence (2001).

SUMMARY OF THE INVENTION

Embodiments of the invention concern a method for communicating data in a computer network. The method includes communicating data on the computer network from a first computing device to a second computing device. The data includes one or more identity parameters which are associated with one or both of the first and second computing devices. The method continues with the step of dynamically modifying at a first location in the computer network a plurality of true values. The true values correctly represent the plurality of identify parameters. These true values are transformed to false values, which incorrectly represent the identity parameters. Subsequently, the identity parameters contained in the data communication are dynamically modified at a second location in the computer network. The modification at the second location involves transformation of the false values back to the true values. Notably, the position of the first and/or second locations within the computer network also varies dynamically as part of this process.

According to another aspect of the invention, the method can further involve performing the dynamic modification of the identity parameters at the first and second locations in accordance with a mission plan. In such embodiments, the method further involves changing the mission plan to a second mission plan (different from the first mission plan) in order to change the dynamic manipulations performed at the first and/or second location. This process of changing the mission plan to a second mission plan is performed without interrupting communication of data in the network. Multiple mission plans can be defined by a user and stored so that they are accessible to network devices. Accordingly, the user can change from one mission plan to a different mission plan as necessary or desirable to maintain security of the network.

The invention also concerns a method for communicating data from a first computing device included in a first computer network, to a second computing device included in a second computer network. The method can begin by transmitting a data communication on the first computer network. The data communication will include a first group of identity parameters which specify true values associated with at least one of the first and second computing devices. Thereafter the process continues by dynamically modifying a first set of the first group of identity parameters at a first location in the first computer network. The dynamic modification involves transforming the first set to specify false information. This transformation is performed before re-transmitting the data communication to a bridge location. At the bridge location, the process continues by dynamically modifying the first set to transform the first set to specify true information. After transforming the first set to specify true information at the bridge location, the method continues by transmitting the data communication from the bridge location to the second computer network. The method further includes dynamically varying a position of the first location within the computer network.

BRIEF DESCRIPTION OF THE DRAWINGS

Embodiments will be described with reference to the following drawing figures, in which like numerals represent like items throughout the figures, and in which:

FIG. 13 is a table that is useful for understanding some of the types of identity parameters that can be modified.

DETAILED DESCRIPTION

The invention is described with reference to the attached figures. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

It should also be appreciated that the terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Further, unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Identity Agile Computer Network

Figure 1:
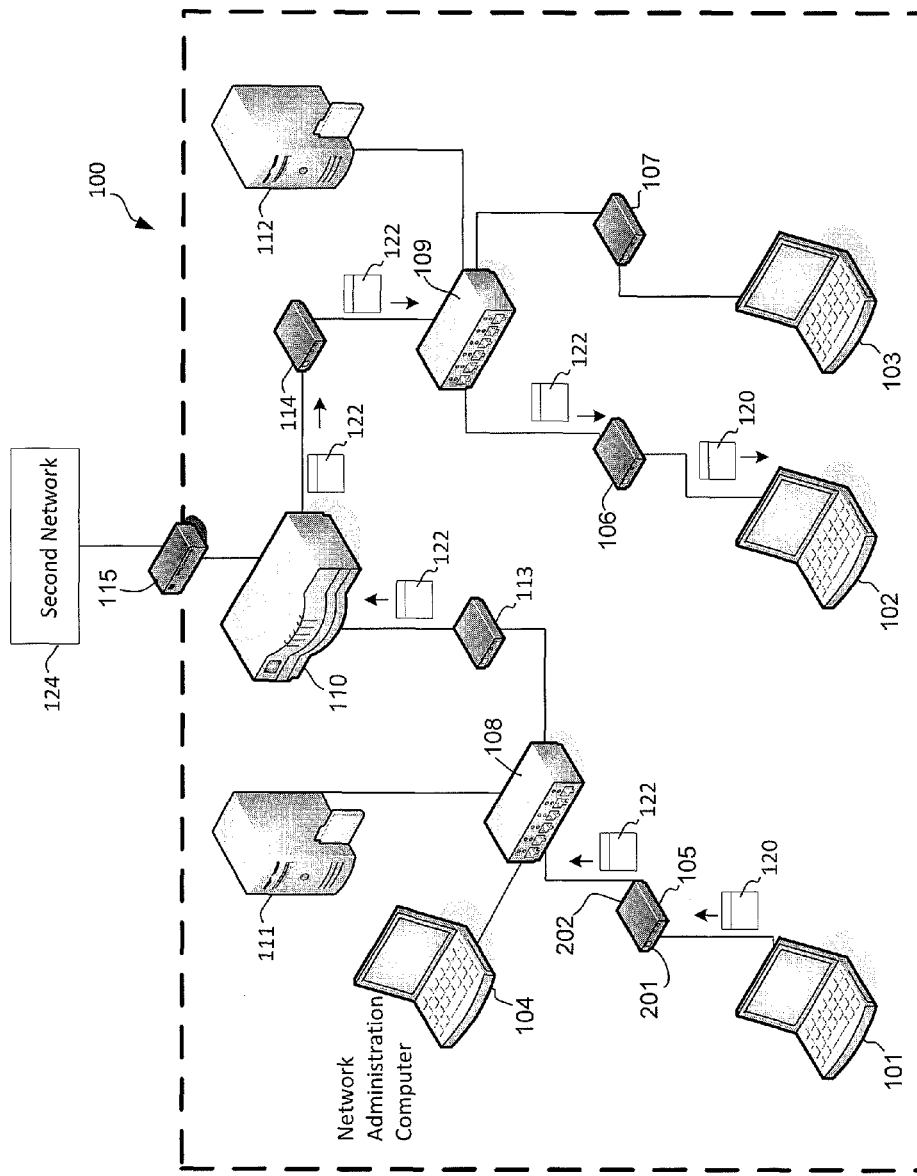
FIG. 1 is an example of a computer network that is useful for understanding the present invention.

Referring now to FIG. 1, there is shown a diagram of an exemplary network 100 which includes a plurality of computing devices. The computing devices can include client computers 101-103, network administration computer (NAC) 104, servers 111, 112, network hubs 108, 109, router 110, and a bridge 115. The client computers can be any type of computing device which might require network services, such as a conventional tablet, notebook, laptop or desktop computer. The router 110 can be a conventional routing device that forwards data packets between computer networks. The hubs 108, 109 are conventional hub devices (e.g. an Ethernet hub) as are well known in the art. Servers 111, 112 can provide various computing services utilized by client computers 101-103. For example, the servers 111, 112 can be file servers which provide a location for shared storage of computer files used by client computers 101-103.

The communication media for the network 100 can be wired, wireless or both, but shall be described herein as a wired network for simplicity and to avoid obscuring the invention. The network will communicate data using a communication protocol. As is well known in the art, the communication protocol defines the formats and rules used for communicating data throughout the network. The network in FIG. 1 can use any communication protocol or combination of protocols which is now known or known in the future. For example, the network can use the well known Ethernet protocol suite for such communications. Alternatively, the network can make use of other protocols, such as the Internet Protocol Suite (often referred to as TCP/IP), SONET/SDH, Asynchronous Transfer Mode (ATM) communication protocols. In some embodiments, one or more of these communication protocols can be used in combination. Although one network topology is shown in FIG. 1, the invention is not limited in this regard. Instead, any type of suitable network topology can be used, such as a bus network, a star network, a ring network or a mesh network.

The invention generally concerns a method for communicating data in a computer network (e.g., in computer network 100), where data is communicated from a first computing device to a second computing device. Computing devices within the network are represented with multiple identity parameters. The phrase "identity parameters" as used herein can include items such as an internet protocol (IP) address, media access control (MAC) address, ports and so on. However, the invention is not limited in this regard, and identity parameters can also include a variety of other information which is useful for characterizing a network node. The various types of identity parameters contemplated herein are discussed below in further detail. The inventive arrangement involve the use of moving target technology (MTT) to manipulate one or more of such identity parameters for one or more computing devices within the network. This technique disguises communication patterns and network address of such computing devices. The manipulation of identity parameters as described herein is generally performed in conjunction with data communications in the network, i.e. when data is to be communicated from a first computer in the network (e.g. client computer 101) to a second computer in the network (e.g., client computer 102). Accordingly, identity parameters that are manipulated can include those of a source computing device (the device from which the data originated) and the destination computing device (the device to which the data is being sent). The set of identity parameter that are communicated is referred to herein as an identity parameter set (IDP set). This concept is illustrated in FIG. 1, which shows that an IDP set 120 is transmitted by client computer 101 as part of a data packet (not shown).

The process according to the inventive arrangements involves selectively modifying at a first location within the computer network, values contained in a data packet or datagram which specify one or more identify parameters of a source and/or destination computing device. The identity parameters are modified in accordance with a mission plan. The location where such modification is performed will generally coincide with the location of one of the modules 105-107, 113, 114. Referring once again to FIG. 1, it can be observed that modules 105, 106, 107, 113, 114 are interposed in the network between the various computing devices which comprise nodes in such network. In these locations, the modules intercept data packet communications, perform the necessary manipulations of identity parameters, and retransmit the data packets along a transmission path. In alternative embodiments, the modules 105, 106, 107, 113, 114 can perform a similar function, but can be integrated directly into one or more of the computing devices. For example, the modules could be integrated into client computers 101, 102, 103, servers 111, 112, hubs 108, 109 and/or within router 110.

Figure 2:
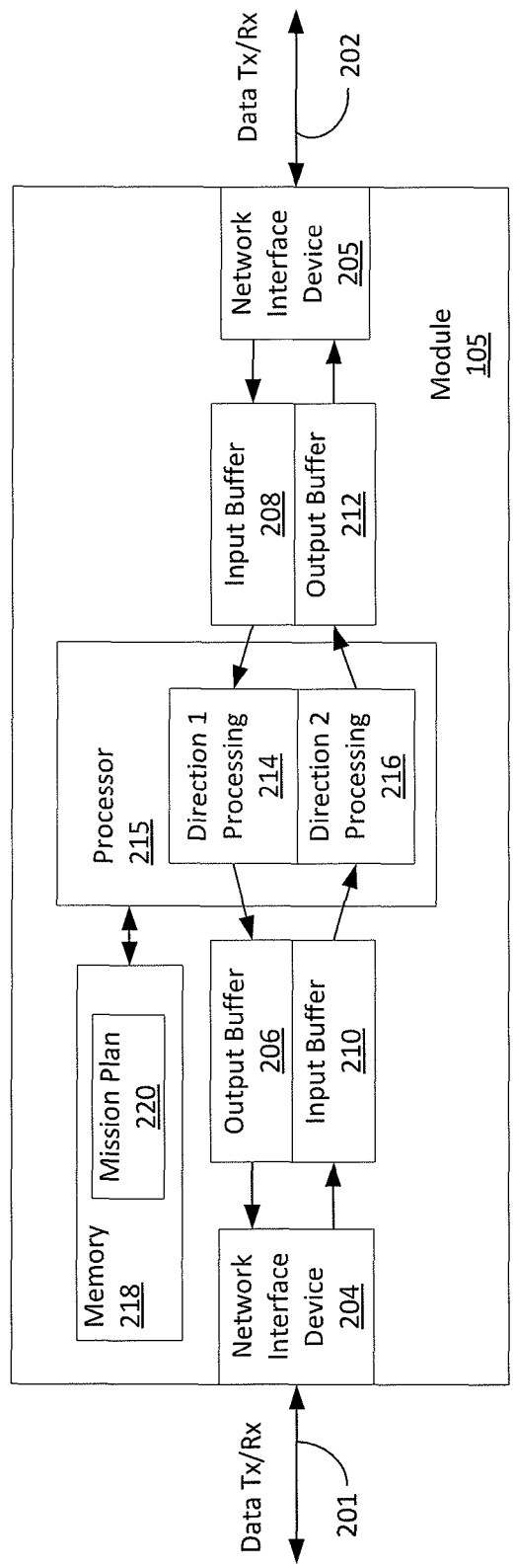
FIG. 2 is an example of a module that can be used in the present invention for performing certain manipulations of identity parameters.

A example of a functional block diagram of a module 105 is shown in FIG. 2. Modules 106-107, 113, 114 can have a similar functional block diagram, but it should be understood that the invention is not limited in this regard. As shown in FIG. 2, the module 105 has at least two data ports 201, 202, each of which can correspond to a respective network interface device 204, 205. Data received at port 201 is processed at network interface device 204 and temporarily stored at an input buffer 210. The processor 215 accesses the input data packets contained in input buffer 210 and performs any necessary manipulation of identity parameters as described herein. The modified data packets are passed to output buffer 212 and subsequently transmitted from port 202 using network interface device 205. Similarly, data received at port 202 is processed at network interface device 205 and temporarily stored at an input buffer 208. The processor 215 accesses the input data packets contained in input buffer 208 and performs any necessary manipulation of identity parameters as described herein. The modified data packets are passed to output buffer 206 and subsequently transmitted from port 201 using network interface device 204. In each module, manipulation of identity parameters is performed by processor 215 in accordance with a mission plan 220 stored in a memory 218.

It will be understood from FIG. 2 that a module is preferably configured so that it operates bi-directionally. In such embodiments, the module can implement different modification functions, depending on a source of a particular data packet. The dynamic modification function in each module can be specified in the mission plan in accordance with a source computing device of a particular data packet. Modules can determine a source of data packets by any suitable means. For example, a source address of a data packet can be used for this purpose.

At a selected module within the network 100, processor 215 will determine one or more false identity parameter values that are to be used in place of the true identity parameter values. The processor will transform one or more true identity parameters values to one or more false identity parameter values which are preferably specified by a pseudorandom function. Following this transformation, the module will forward the modified packet or datagram to the next node of the network along a transmission path. At subsequent points in the communication path, an adversary who is monitoring such network communications will observe false or incorrect information about the identity of computing devices communicating on the network.

In a preferred embodiment, the false identity parameters that are specified by the pseudorandom function are varied in accordance with the occurrence of one or more trigger events. The trigger event causes the processor 215 to use the pseudorandom function to generate a new set of false identity parameter values into which the true identity parameters are transformed. Accordingly, the trigger event serves as a basis for the dynamic variation of the false identity parameters described herein. Trigger events are discussed in more detail below. However it should be noted that trigger events for selecting a new set of false values for identity parameters can be based on the passage of time and/or the occurrence of certain network events. Trigger events can also be initiated by a user command.

The transformation of identity parameters described above provides one way to maneuver a computer network 100 for purposes of thwarting a cyber attack. In a preferred embodiment, the mission plan 220 implemented by processor 215 will also control certain other aspects of the manner in which computer network can maneuver. For example, the mission plan can specify that a dynamic selection of identity parameters are manipulated. The dynamic selection can include a choice of which identity parameters are selected for modification, and/or a number of such identity parameters that are selected. This variable selection process provides an added dimension of uncertainty or variation which can be used to further thwart an adversary's effort to infiltrate or learn about a computer network 100. As an example of this technique, consider that during a first time period, a module can modify a destination IP address and a destination MAC address of each data packet. During a second time period the module could manipulate the source IP address and a source host name in each data packet. During a third period of time the module could manipulate a source port number and a source user name. Changes in the selection of identity parameters can occur synchronously (all selected identity parameters are changed at the same time). Alternatively, changes in the selection of identity parameters can occur asynchronously (the group of selected identity parameters changes incrementally as individual identity parameters are added or removed from the group of selected identity parameters).

A pseudorandom function is preferably used for determining the selection of identity values that are to be manipulated or transformed into false values. In other words, the module will transform only the identity parameters selected by the pseudo-random function. In a preferred embodiment, the selection of identity parameters that are specified by the pseudorandom function is varied in accordance with the occurrence of a trigger event. The trigger event causes processor 215 use a pseudorandom function to generate a new selection of identity parameters which are to be transformed into false identity parameters. Accordingly, the trigger event serves as a basis for the dynamic variation of the selection of identity parameters described herein. Notably, the values of the identity parameters can also be varied in accordance with pseudorandom algorithm.

The modules are advantageously capable of also providing a third method of maneuvering the computer network for purposes of thwarting a cyber attack. Specifically, the mission plan loaded in each module can dynamically vary the location within the network where the modification or transformation of the identity parameters takes place. Consider that modification of identity parameters in an IDP set 120 sent from client computer 101 to client computer 102, could occur in module 105. This condition is shown in FIG. 1, where the identity parameters contained in IDP set 120 are manipulated in module 105 so that IDP set 120 is transformed to a new or modified IDP set 122. At least some of the identity parameters in IDP set 122 are different as compared to the identity parameters in IDP set 120. But the location where such transformation occurs is preferably also controlled by the mission plan. Accordingly, manipulation of IDP set 120 could, for example, sometimes occur at module 113 or 114, instead of at module 105. This ability to selectively vary the location where manipulation of identity parameters occurs adds a further important dimension to the maneuvering capability of the computer network.

The dynamic variation in the location where identity parameters are modified is facilitated by selectively controlling an operating state of each module. To that end, the operational states of each module preferably includes (1) an active state in which data is processed in accordance with a current mission plan, and (2) a by-pass state in which packets can flow through the module as if the module was not present. The location where the dynamic modification is performed is controlled by selectively causing certain modules to be in an active state and certain modules to be in a standby state. The location can be dynamically changed by dynamically varying the current state of the modules in a coordinated manner.

The mission plan can include predefined sequence for determining the locations within the computer network 100 where identity parameters are to be manipulated. Locations where identity parameters are to be manipulated will change in accordance with the sequence at times indicated by a trigger event. For example, the trigger event can causes a transition to a new location for manipulation or transformation of identity parameters as described herein. Accordingly, the trigger event serves as a basis for the occurrence of a change in the location where identity parameters are modified, and the predefined sequence determines where the new location will be.

From the foregoing, it will be appreciated that a data packet is modified at a module to include false identity parameters. At some point within the computer network, it is necessary to restore the identity parameters to their true values, so that the identity parameters can be used to properly perform their intended function in accordance with the particular network protocol. Accordingly, the inventive arrangements also includes dynamically modifying, at a second location (i.e., a second module), the assigned values for the identity parameters in accordance with the mission plan. The modification at the second location essentially comprises an inverse of a process used at the first location to modify the identity parameters. The module at the second location can thus restore or transform the false value identity parameters back to their true values. In order to accomplish this action, the module at the second location must be able to determine at least (1) a selection of identity parameter value that are to be transformed, and (2) a correct transformation of the selected identity parameters from false values to true values. In effect, this process involves an inverse of the pseudorandom process or processes used to determine the identity parameter selection and the changes effected to such identity parameter values. The inverse transformation step is illustrated in FIG. 1, where the IDP set 122 is received at module 106, and the identity parameter values in IDP set 122 are transformed or manipulated back to their original or true values. In this scenario, module 106 converts the identity parameters values back to those of IDP set 120.

Notably, a module must have some way of determining the proper transformation or manipulation to apply to each data communication it receives. In a preferred embodiment, this determination is performed by examining at least a source address identity parameter contained within the received data communication. For example, the source address identity parameter can include an IP address of a source computing device. Once the true identity of the source computing device is known, the module consults the mission plan (or information derived from the mission plan) to determine what actions it needs to take. For example, these actions could include converting certain true identity parameter values to false identity parameter values. Alternatively, these changes could include converting false identity parameter values back to true identity parameter values.

Notably, there will be instances where the source address identity parameter information contained in a received data communication has been changed to a false value. In those circumstances, the module receiving the data communication will not immediately be able to determine the identity of the source of the data communication. However, the module which received the communication can in such instances still identify the source computing device. This is accomplished at the receiving module by comparing the false source address identity parameter value to a look-up-table (LUT) which lists all such false source address identity parameter values in use during a particular time. The LUT also includes a list of true source address identity parameter values that correspond to the false source address values. The LUT can be provided directly by the mission plan or can be generated by information contained within the mission plan. In either case, the identification of a true source address identity parameter value can be easily determined from the LUT. Once the true source address identity parameter has been determined, then the module which received the data communication can use this information to determine (based on the mission plan) what manipulations to the identity parameters are needed.

Notably, the mission plan can also specify a variation in the second location where identity parameters are restored to their true values. For example, assume that the identity parameters are dynamically modified at a first location comprising module 105. The mission plan can specify that the restoration of the identity parameters to their true values occurs at module 106 as described, but can alternatively specify that dynamic modification occur instead at module 113 or 114. In some embodiments, the location where such manipulations occur is dynamically determined by the mission plan in accordance with a predefined sequence. The predefined sequence can determine the sequence of locations or modules where the manipulation of identity parameters will occur.

The transition involving dynamic modification at different locations preferably occurs in accordance with a trigger event. Accordingly, the predefined sequence determines the pattern or sequence of locations where data manipulations will occur, and the trigger event serves as a basis for causing the transition from one location to the next. Trigger events are discussed in more detail below; however, it should be noted that trigger events can be based on the passage of time, user control, and/or the occurrence of certain network events. Control over the choice of a second location (i.e., where identity parameters are returned to their true values) can be effected in the same manner as described above with regard to the first location. Specifically, operating states of two or more modules can be toggled between an active state and a bypass state. Manipulation of identity parameters will only occur in the module which has an active operating state. The module with a bypass operating state will simply pass data packets without modification.

Alternative methods can also be used for controlling the location where manipulation of identity parameters will occur. For example, a network administrator can define in a mission plan several possible modules where a identity parameters can be converted from true values to false values. Upon the occurrence of a trigger event, a new location can be selected from among the several modules by using a pseudorandom function, and using a trigger time as a seed value for the pseudorandom function. If each module implements the same pseudorandom function using the same initial seed values then each module will calculate the same pseudorandom value. The trigger time can be determined based on a clock time, such as a GPS time or system clock time). In this way, each module can independently determine whether it is currently an active location where manipulation of identity parameters should occur. Similarly, the network administrator can define in a mission plan several possible modules where dynamic manipulation returns the identity parameters to their correct or true values. The selection of which module is used for this purpose can also be determined in accordance with a trigger time and a pseudorandom function as described herein. Other methods are also possible for determining the location or module where identity parameter manipulations are to occur. Accordingly, the invention is not intended to be limited to the particular methods described herein.

Notably, varying the position of the first and/or second locations where identity functions are manipulated will often result in varying a physical distance between the first and second location along a network communication path. The distance between the first and second locations is referred to herein as a distance vector. The distance vector can be an actual physical distance along a communication path between the first and second location. However, it is useful to think of the distance vector as representing the number of network nodes that are present in a communication path between the first and second locations. It will be appreciated that dynamically choosing different position for the first and second locations within the network can have the effect of changing the number of nodes between the first and second locations. For example, in FIG. 1 the dynamic modification of identity parameters are implemented in selected ones of the modules 105, 106, 107, 113, 114. The modules actually used to respectively implement the dynamic modification is determined as previously described. If module 105 is used for converting identity parameters to false values and module 106 is used to convert them back to true values, then there are three network nodes (108, 110, 109) between modules 105 and 106. But if module 113 is used to convert to false values and module 114 is used to convert the identity parameters back to true values, then there is only one network node (110) between modules 113 and 114. Accordingly, it will be appreciated that dynamically changing the position of locations where dynamic modification occurs can dynamically vary the distance vector. This variation of the distance vector provides an added dimension of variability to network maneuvering or modification as described herein.

In the present invention, the manipulation of identity parameter values, the selection of identity parameters, and the locations where these identity parameters is each defined as a maneuvering parameter. Whenever a change occurs in one of these three maneuvering parameters, it can be said that a network maneuver has occurred. Any time one of these three maneuvering parameters is changed, we can say that a network maneuver has occurred. In order to most effectively thwart an adversary's efforts to infiltrate a computer network 100, network maneuvering is preferably controlled by means of a pseudorandom process as previously described. Those skilled in the art will appreciate that a chaotic process can also be used for performing this function. Chaotic processes are technically different as compared to pseudorandom functions, but for purposes of the present invention, either can be used, and the two are considered equivalent. In some embodiments, the same pseudorandom process can be used for dynamically varying two or more of the maneuvering parameters. However, in a preferred embodiment of the invention, two or more different pseudorandom processes are used so that two or more of these maneuvering parameters are modified independently of the others.

Trigger Events

As noted above, the dynamic changes to each of the maneuvering parameters is controlled by at least one trigger. A trigger is an event that causes a change to occur in relation to the dynamic modifications described herein. Stated differently, it can be said that the trigger causes the network to maneuver in a new way that is different than at a previous time (i.e., before the occurrence of the trigger). For example, during a first period of time, a mission plan can cause an IP address can be changed from value A to value B; but after the trigger event, the IP address can instead be changed from value A to value C. Similarly, during a first period of time a mission plan can cause an IP and MAC address to be modified; but after the trigger event, the mission plan can instead cause a MAC address and user name to be modified. As a third example, consider that during a first period of time a mission plan may cause identity parameters to be changed when an ID set 120 arrives at module 105; but after the trigger event, can cause the identity parameters to instead be changed when and ID set 120 arrives at module 113.

In its simplest form a trigger can be user activated or based on a simple timing scheme. In such an embodiment, a clock time in each module could serve as a trigger. For example, a trigger event could be defined as occurring at the expiration of every 60 second time interval. For such an arrangement, one or more of the maneuvering parameters could change every 60 seconds in accordance with a predetermined clock time. In some embodiments, all of the maneuvering parameters can change concurrently so that the changes are synchronized. In a slightly more complex embodiment, a time-based trigger arrangement can also be used, but a different unique trigger time interval can be selected for each maneuvering parameter. Thus, false identity parameter values could be changed at time interval X, a selection of identity parameters would change in accordance with a time interval Y, and a location where such changes are performed would occur at time interval Z, where X, Y and Z are different values.

It will be appreciated that in embodiments of the invention which rely upon clock time as a trigger mechanism, it is advantageous to provide synchronization as between the clocks in various modules 105, 106, 107, 113, 114 to ensure that packets are not lost or dropped due to unrecognized identity parameters. Synchronization methods are well known and any suitable synchronization mechanism can be used for this purpose. For example, the modules could be synchronized by using a highly accurate time reference such as a GPS clock time. Alternatively, a unique wireless synchronization signal could be broadcast to each of the modules from a central control facility.

Other types of triggers are also possible with the present invention. For example, trigger events can be based on the occurrence or detection of potential network security threats. According to an embodiment of the invention, a potential network security threat can be identified by a network security software suite. Alternatively, the potential network security threat can be identified upon the receipt of a data packet at a module 105, 106, 107, 113, 114 where the packet contains one or more identity parameters that are inconsistent with the present state of network maneuvering. Regardless of the basis for identifying a network security threat, the existence of such threat can serve as a trigger event. A trigger event based on a network security threat can cause the same types of network maneuvers as those caused by the time based triggers described above. For example, false identity parameters, the selection of identity parameters and the locations of identity parameter transformations could remain stable (i.e., unchanged) except in the case were a network security threat was detected. Such an arrangement might be chosen, for example, in computer networks where frequent network maneuvering is not desirable.

Alternatively, time based trigger events can be combined with trigger events based on potential threats to network security. In such embodiments, a trigger event based on a security threat can have a different effect on the network maneuvering as compared to time based triggers. For example, a security threat-based trigger event can cause strategic or defensive changes in the network maneuvering so as to more aggressively counter such network security threat. The precise nature of such measures can depend on the nature of the threat, but can include a variety of responses. For example, different pseudorandom algorithms can be selected, and/or the number of identity parameters selected for manipulation in each IDP set 120 can be increased. In systems that already make use of time based triggers, the response can also include increasing a frequency of network maneuvering. Thus, more frequent changes can be made with respect to (1) the false identity parameter values, (2) the selection of identity parameters to be changed in each IDP set, and/or (3) the position of the first and second locations where identity parameters are changed. Accordingly, the network maneuvering described herein provides a method for identifying potential network security threats and responding to same.

Mission Plans

According to a preferred embodiment of the invention, the network maneuvering described herein is controlled in accordance with a mission plan. A mission plan is a schema that defines and controls maneuverability within the context of a network and a security model. As such, the mission plan can be represented as a data file that is communicated from the network administration computer (NAC) 104 to each module 105-107, 113-114. The mission plan is thereafter used by each module to control the manipulation of identity parameters and coordinate its activities with the actions of the other modules in the network.

According to a preferred embodiment, the mission plan can be modified from time to time by a network administrator to update or change the way in which the network maneuvers to thwart potential adversaries. As such, the mission plan provides a network administrator with a tool that facilitates complete control over the time, place and manner in which network maneuvering will occur within the network. Such update ability allows the network administrator to tailor the behavior of the computer network to the current operating conditions and more effectively thwart adversary efforts to infiltrate the network. Multiple mission plans can be defined by a user and stored so that they are accessible to modules within the network. For example, the multiple mission plans can be stored at NAC 104 and communicated to modules as needed. Alternatively, a plurality of mission plans can be stored on each module and can be activated as necessary or desirable to maintain security of the network. For example, if the network administrator determines or suspects that an adversary has discovered a current mission plan for a network, the administrator may wish to change the mission plan. Effective security procedures can also dictate that the mission plan be periodically changed.

Figure 3:
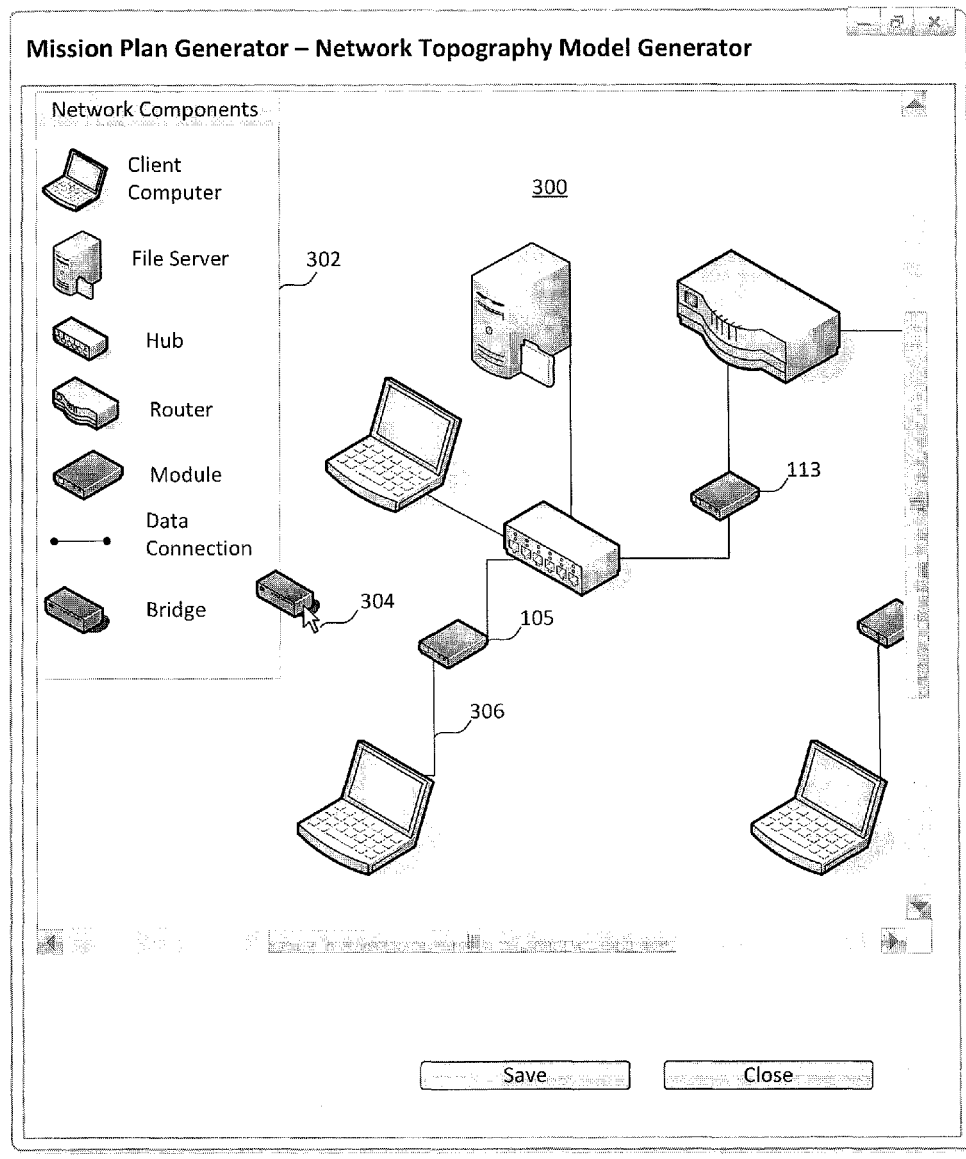
FIG. 3 is a drawing that is useful for understanding a tool that can be used to help characterize the network in FIG. 1.

The process of creating a mission plan can begin by modeling the network 100. The creation of the model is facilitated by a network control software application (NCSA) executing on a computer or server at the network command center. For example, in the embodiment shown in FIG. 1, the NCSA can execute on NAC 104. The network model preferably includes information which defines data connections and/or relationships between various computing devices included in the network 100. The NCSA will provide a suitable interface which facilitates entry of such relationship data. According to one embodiment, the NCSA can facilitate entry of data into tables which can be used to define the mission plan. However, in a preferred embodiment, a graphic user interface is used to facilitate this process. Referring now to FIG. 3, the NCSA can include a network topography model generator tool. The tool is used to assist the network administrator in defining the relationship between each of the various components of the networks. The network topography tool provides a workspace 300 in which an administrator can drag and drop network components 302, by using a cursor 304. The network administrator can also create data connections 306 between various network components 302. As part of this modeling process, the network administrator can provide network address information for the various network components, including the modules 105-107, 113, 114.

Figure 4:
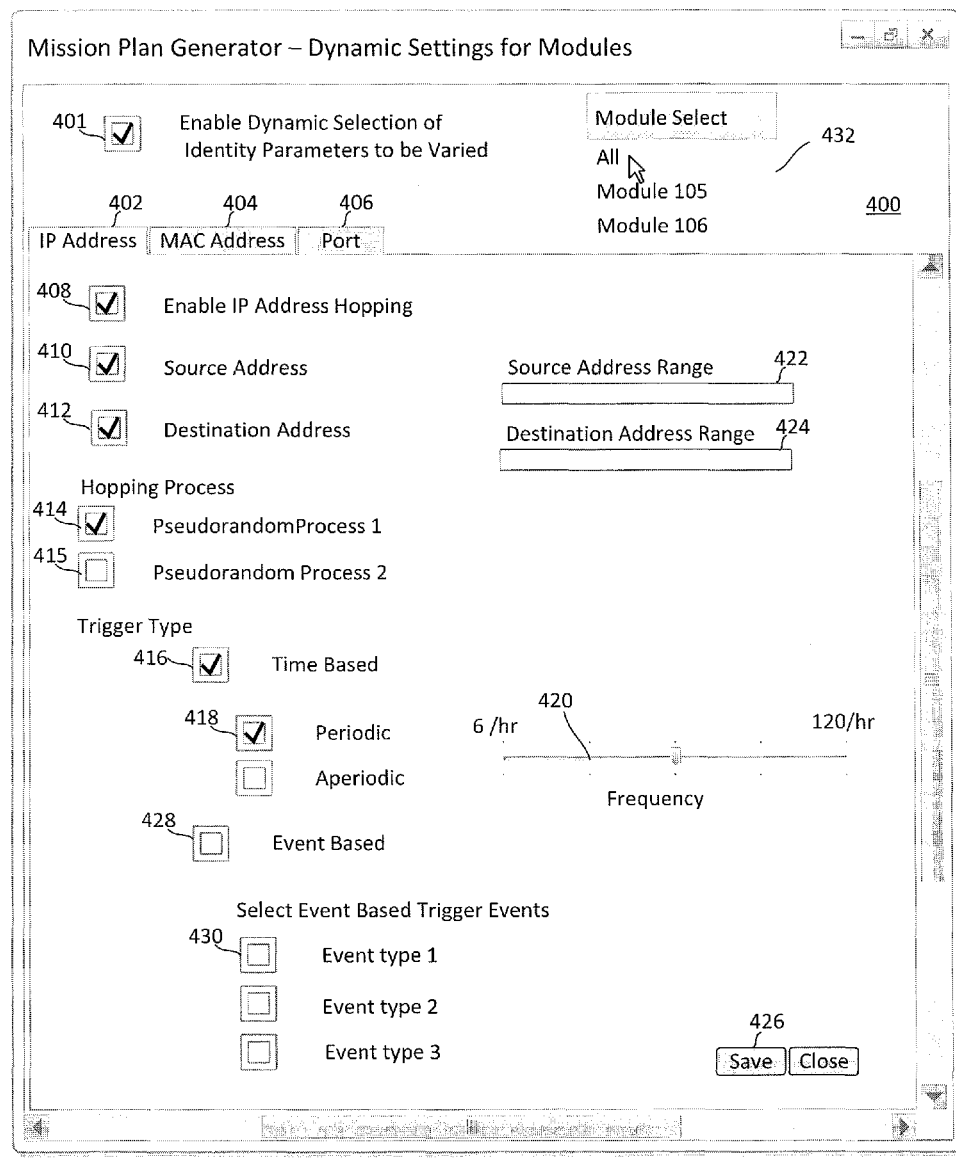
FIG. 4, is an example of a dialog box of a graphical user interface that can be used to select dynamic settings for modules in FIG. 1.

Once the network has been modeled, it can be saved and used by the network administrator to define the manner in which the various modules 105-107, 113, 114 behave and interact with one another. Referring now to FIG. 4, the NCSA can generate a dialog box 400 of which can be used to further develop a mission plan. A drop-down menu 432 can be used to select the particular module (e.g. module 105) to which the settings in dialog box 400 are to be applied. Alternatively, the network administrator can use drop-down menu 432 to indicate that the settings in dialog box 400 are intended to be applied to all modules within the network (e.g., by selecting "All" in menu 432). The process can continue by specifying whether a fixed set of identity parameters will always be modified in each of the modules, or whether the set of identity parameters that are manipulated shall be dynamically varied. If the selection or set of identity parameters that are to be manipulated in the modules is intended to be dynamically varied, the network administrator can mark check-box 401 to indicate that preference. If the check-box 401 is not marked, that will indicate that the set of identity parameters to be varied is a fixed set that does not vary over time.

The dialog box 400 includes tabs 402, 404, 406 which allow a user to select the particular identity parameter that he wants to work with for purposes of creating a mission plan. For purposes of this disclosure, the dialog box 400 facilitates dynamic variation of only three identity parameters. Specifically, these include the IP address, MAC address and Port Address. More or fewer identity parameters can be dynamically varied by providing additional tabs, but the three identity parameters noted are sufficient to explain the inventive concepts. In FIG. 4, the user has selected the tab 402 to work with the IP Address type of identity parameter. Within tab 402, a variety of user interface controls 408-420 are provided for specifying the details relating to the dynamic variation of IP addresses within the selected module. More or fewer controls can be provided to facilitate the dynamic manipulation of the IP Address type, and the controls shown are merely provided to assist the reader in understanding the concept. In the example shown, the network administrator can enable dynamic variation of IP addresses by selecting (e.g. with a pointing device such as a mouse) the check-box 408 marked: Enable IP Address Hopping. Similarly, the network administrator can indicate whether the source address, destination address or both are to be varied. In this example, the source and destination address boxes 410, 412 are both marked, indicating that both types of addresses are to be changed. The range of allowed values for the source and destination addresses can be specified by the administrator in list boxes 422, 424.

The particular pseudorandom process used to select false IP address values is specified by selecting a pseudorandom process. This selection is specified in boxes 414, 415. Different pseudorandom processes can have different levels of complexity for variable degrees of true randomness, and the administrator can choose the process that best suits the needs of the network 100.

Dialog box 400 also allows a network administrator to set the trigger type to be used for the dynamic variation of the IP Address identity parameter. In this example, the user has selected box 416, indicating that a time based trigger is to be used for determining when to transition to new false IP address values. Moreover, checkbox 418 has been selected to indicate that the time based trigger is to occur on a periodic basis. Slider 420 can be adjusted by the user to determine the frequency of the periodic time based trigger. In the example shown, the trigger frequency can be adjusted between 6 trigger occurrences per hour (trigger every 10 minutes) and 120 trigger occurrences per hour (trigger every 30 seconds). In this example, selections are available for other types of triggers as well. For example, dialog box 402 includes check boxes 428, 430 by which the network administrator can select an event-based trigger. Several different specific event types can be selected to form the basis for such event-based triggers (e.g., Event type 1, Event type 2, etc.). These event types can include the detection of various potential computer network security threats. In FIG. 4, tabs 404 and 406 are similar to tab 402, but the controls therein are tailored to the dynamic variation of the MAC Address and Port value rather than the IP Address. Additional tabs could be provided for controlling the dynamic variation of other types of identity parameters.

The mission plan can also specify a plan for dynamically varying the location where identity parameters are modified. In some embodiments, this variable location feature is facilitated by controlling a sequence that defines when each module is in an active state or a bypass state. Accordingly, the mission plan advantageously includes some means of specifying this sequence. In some embodiments of the invention, this can involve the use of defined time intervals or time slots, which are separated by the occurrence of a trigger event.

Figure 5:
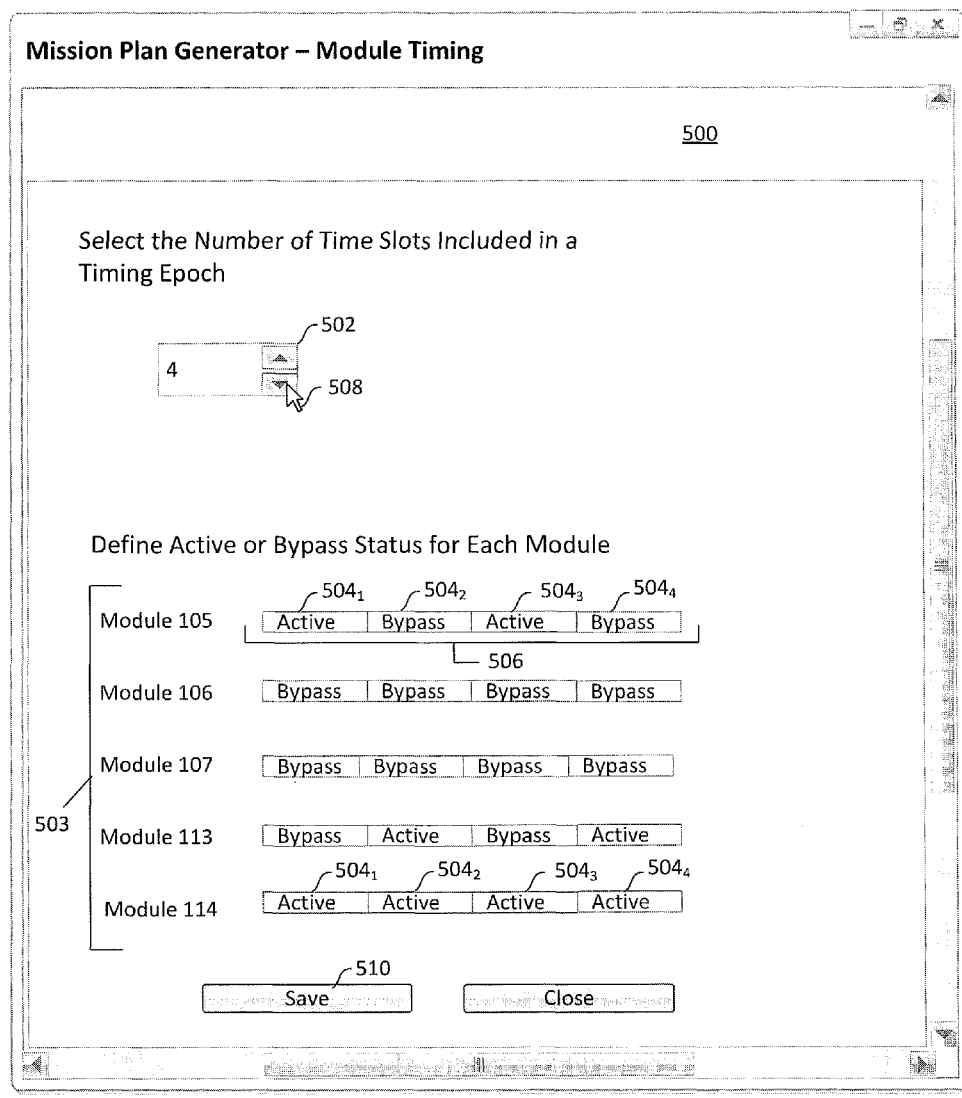
FIG. 5 is an example of a dialog box of a graphical user interface that can be used to select a sequence of active states and bypass states associated with each module in FIG. 1.

Referring now to FIG. 5, a dialog box 500 can be provided by the NCSA to facilitate coordination and entry of location sequence and timing information. Dialog box 500 can include a control 502 for selecting a number of time slots $504_1$-$504_n$, which are to be included within a time epoch 506. In the example illustrated, the network administrator has defined 4 time slots per timing epoch. The dialog box 500 can also include a table 503 which includes all modules in the network 100. For each module listed, the table includes a graphical representation of available time slots $504_1$-$504_4$ for one timing epoch 506. Recall that dynamic control over the location where identity parameters are manipulated is determined by whether each module is in an active or bypass operating states. Accordingly, within the graphical user interface, the user can move a cursor 508 and make selections to specify whether a particular module is in an active or bypass mode during each time slot. In the example shown, module 105 is active during time slot $504_1$ and $504_3$, but is in a bypass mode during time slots $504_2$, $504_4$. Conversely, module 113 is active during time slots $504_2$, $504_4$, but is in bypass mode during time slots $504_1$ and $504_3$. With reference to FIG. 1, this means that manipulation of identity parameters occurs at a location associated with module 105 during time slots slot $504_1$ and $504_3$, but occurs instead at module 113 during time slots $504_2$, $504_4$.

In the example shown in FIG. 5, the network administrator has elected to have module 114 always operate in an active mode (i.e. module 114 is active during all time slots. Accordingly, for data communications transmitted from client computer 101 to client computer 103, data packets will alternately be manipulated in modules 105, 113, but will always be manipulated at module 114. Finally, in this example, the network administrator has elected to maintain modules 106 and 107 in a bypass mode during time slots $504_1$-$504_4$. Accordingly, no manipulation of identity parameters will be performed at these modules during any of the defined time slots. Once the module timing has been defined in dialog box 500, the network administrator can select the button 510 to store the changes as part of an updated mission plan. The mission plan can be saved in various formats. In some embodiments, the mission plan can be saved as a simple table or other type of defined data structure that can be used by each module for controlling the behavior of the module.

Distribution And Loading of Mission Plans

The distribution and loading of mission plans as disclosed herein will now be described in further detail. Referring once again to FIG. 1, it can be observed that the modules 105-107, 113, 114 are distributed throughout the network 100 at one or more locations. The modules are integrated within the communications pathways to intercept communications at such locations, perform the necessary manipulations, and forward data to other computing devices within the network. With the foregoing arrangement, any necessary maintenance of the modules described herein (e.g. maintenance to update a mission plan) will have the potential to disrupt network communications while the modules are replaced or reprogrammed. Such disruptions are undesirable in many situations where reliability and availability of network services is essential. For example, uninterrupted network operation can be essential for computer networks used by military, emergency services and businesses.

In order to ensure uninterrupted network operations, each module preferably has several operating states. These operating states include (1) an off state in which the module is powered down and does not process any packets, (2) an initialization state in which the module installs software scripts in accordance with the mission plan, (3) an active state in which data is processed in accordance with a current mission plan, and (4) a by-pass state in which packets can flow through the module as if the module was not present. The module is configured so that, when it is in the active state or the by-pass state, the module can receive and load an updated mission plan provided by a network administrator. The module operating states can be manually controlled by the network administrator by means of the NCSA executing, for example, on NAC 104. For example, the user can select operating states for various modules through the use of a graphical user interface control panel. Commands for controlling the operating states of the network are communicated over the network 100, or can be communicated by any other suitable means. For example, a separate wired or wireless network (not shown) can be used for that purpose.

Figure 6:
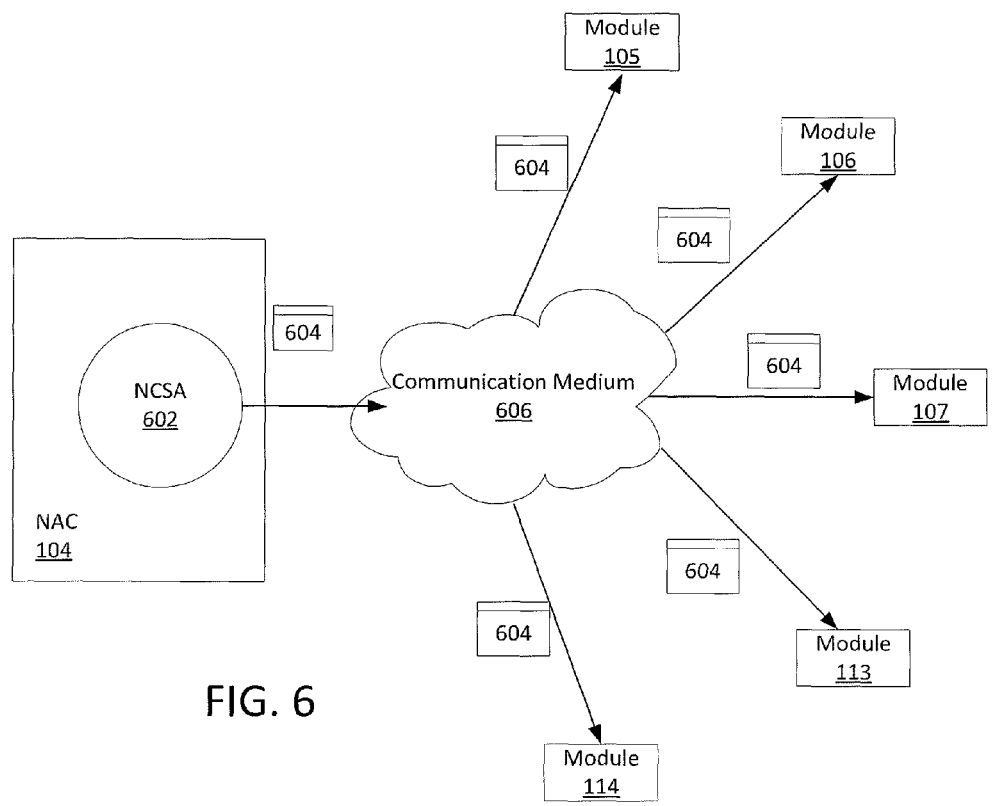
FIG. 6 is a diagram that is useful for understanding the way in which a mission plan can be communicated to a plurality of modules in the network in FIG. 1.
Figure 7:
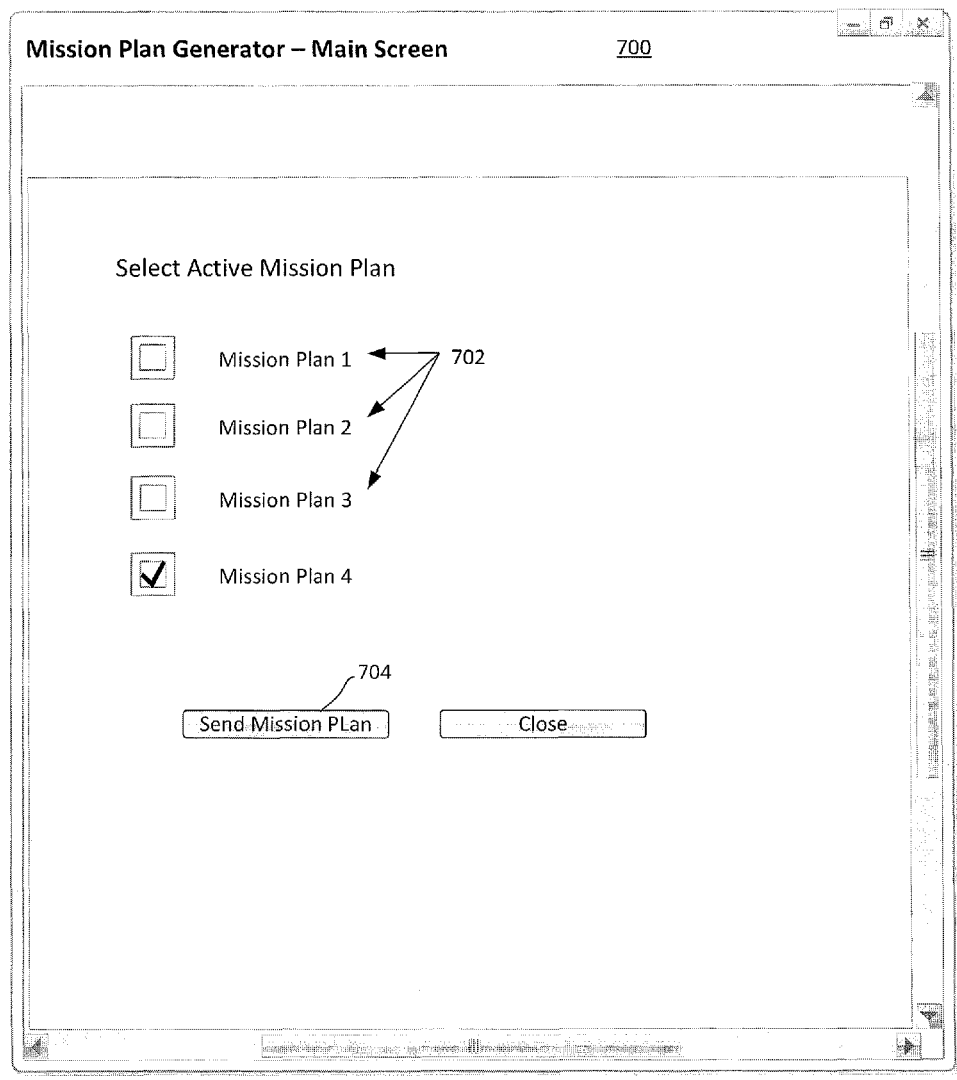
FIG. 7 is an example of a dialog box of a graphical user interface that can be used to select a mission plan and communicate the mission plan to the modules as shown in FIG. 6.

The mission plan can be loaded directly at the physical location of each module, or it can be communicated to the module from the NCSA. This concept is illustrated in FIG. 6, which shows mission plans 604 being communicated from NCSA 602 to each of the modules 105-107, 113, 114 over a communication medium 606. In the example shown, the NCSA software application is executing on NAC 104 operated by a network administrator. The communication medium can in some embodiments include in-band signaling using computer network 100. Alternatively, an out-of-band network (e.g. a separate wireless network) can be used as the communication medium 606 to communicate the updated mission plan from the NCSA to each module. As shown in FIG. 7, the NCSA can provide a dialog box 700 to facilitate selection of one of several mission plans 702. Each of these mission plans 702 can be stored on NAC 104. The network administrator can select from one of the several mission plans 702, after which they can activate a Send Mission Plan button 704. Alternatively, a plurality of mission plans can be communicated to each module and stored there. In either scenario, the user can choose one of the defined mission plans to activate.

In response to the command to send the mission plan, the selected mission plan is communicated to the modules while they are in an active state in which they are configured for actively performing dynamic modification of identity parameters as described herein. Such an arrangement minimizes the time during which the network operates in the clear and without manipulating identity parameters. However, the updated mission plan can also be communicated to the modules while they are in the by-pass mode, and this approach may be desirable in certain cases.

Once the mission plan is received by a module, it is automatically stored in a memory location within the module. Thereafter, the module can be caused to enter the by-pass state and, while still in that state, the module can load the data associated with the new mission plan. This process of entering into the by-pass state and loading the new mission plan data can occur automatically in response to receipt of the mission plan, or can occur in response to a command from the NCSA software controlled by the network administrator. The new mission plan preferably includes changes in the way that identity parameter values are varied. Once the new mission plan has been loaded, the modules 105-107, 113, and 114 can be transitioned from the by-pass mode to the active mode in a synchronized way to ensure that data communication errors do not occur. The mission plan can specify a time when the modules are to return to the active mode, or the network administrator can use the NCSA to communicate a command to the various modules, directing them to enter into the active mode. The foregoing process of updating a mission plan advantageously allows changes in network security procedures to occur without disrupting communication among the various computing devices attached to the computer network 100.

The dynamic manipulation of various identity parameters at each module 105, 106, 107, 113, and 114 is preferably controlled by the application software executing on each module 105-107, 113, 114. However, the behavior of the application software is advantageously controlled by the mission plan.

Figure 8:
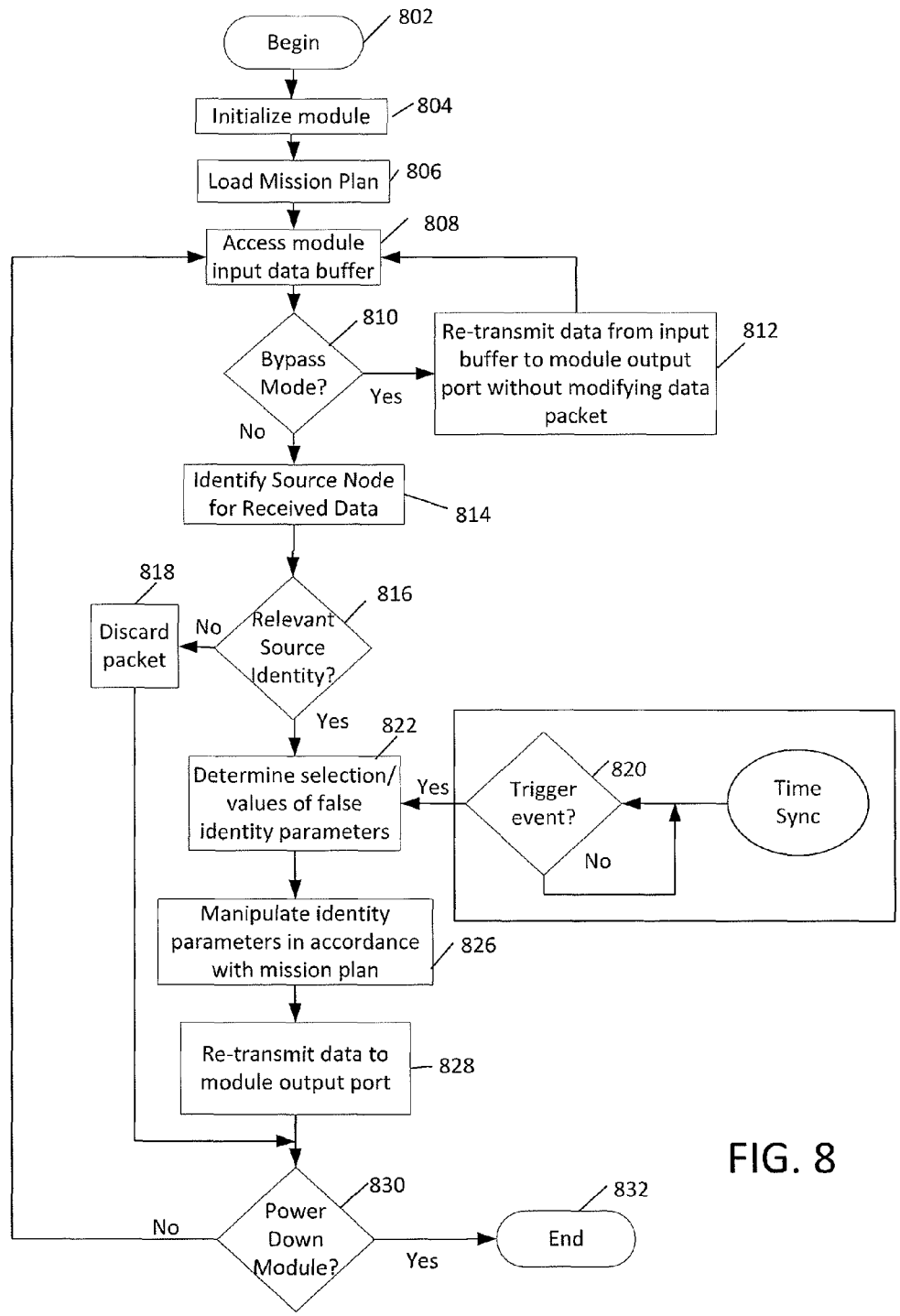
FIG. 8 is a flowchart that is useful for understanding the operation of a module in FIG. 1.

Referring now to FIG. 8, there is provided a flowchart which summarizes the operation of each module 105-107, 113, 114. To avoid confusion, the process is described with respect to communications in a single direction. For example in the case of module 105, the single direction could involve data transmitted from client computer 101 to hub 108. In practice however, it is preferred that modules 105-107, 113, 114 operate bi-directionally. The process begins at step 802 when the module is powered up and continues to step 804 where module application software is initialized for executing the methods described herein. In step 806, a mission plan is loaded from a memory location within the module. At this point, the module is ready to begin processing data and proceeds to do so at step 808, where it accesses a data packet from an input data buffer of the module. In step 810, the module checks to determine if it is in a bypass mode of operation. If so, the data packet accessed in step 808 is retransmitted in step 812 without any modification of the data packet. If the module is not in bypass mode, then it must be in its active mode of operation and continues on to step 814. In step 814, the module reads the data packet to determine the identity of a source node from which the data packet originated. In step 816, it examines the packet to determine if the source node is valid. The specified source node can be compared to a list of valid nodes to determine if the specified source node is currently valid. If it is not a valid node then the packet is discarded in step 818. In step 820 the process checks to determine if a trigger event occurred. The occurrence of a trigger event will influence the selection of false identify values to use. Accordingly, in step 822, the module determines the false identify values to use based on one or more of the trigger information, clock time and mission plan. The module then continues to step 826 where it manipulates identity parameters of the data packet. Once manipulations are complete, the data packet is re-transmitted to an adjacent node from the output port of the module. In step 830, a determination is made as to whether the module has been commanded to power down. If so, the process ends at step 832. In step 808 the process continues and the next data packet is accessed from the module's input data buffer.

Figure 9:
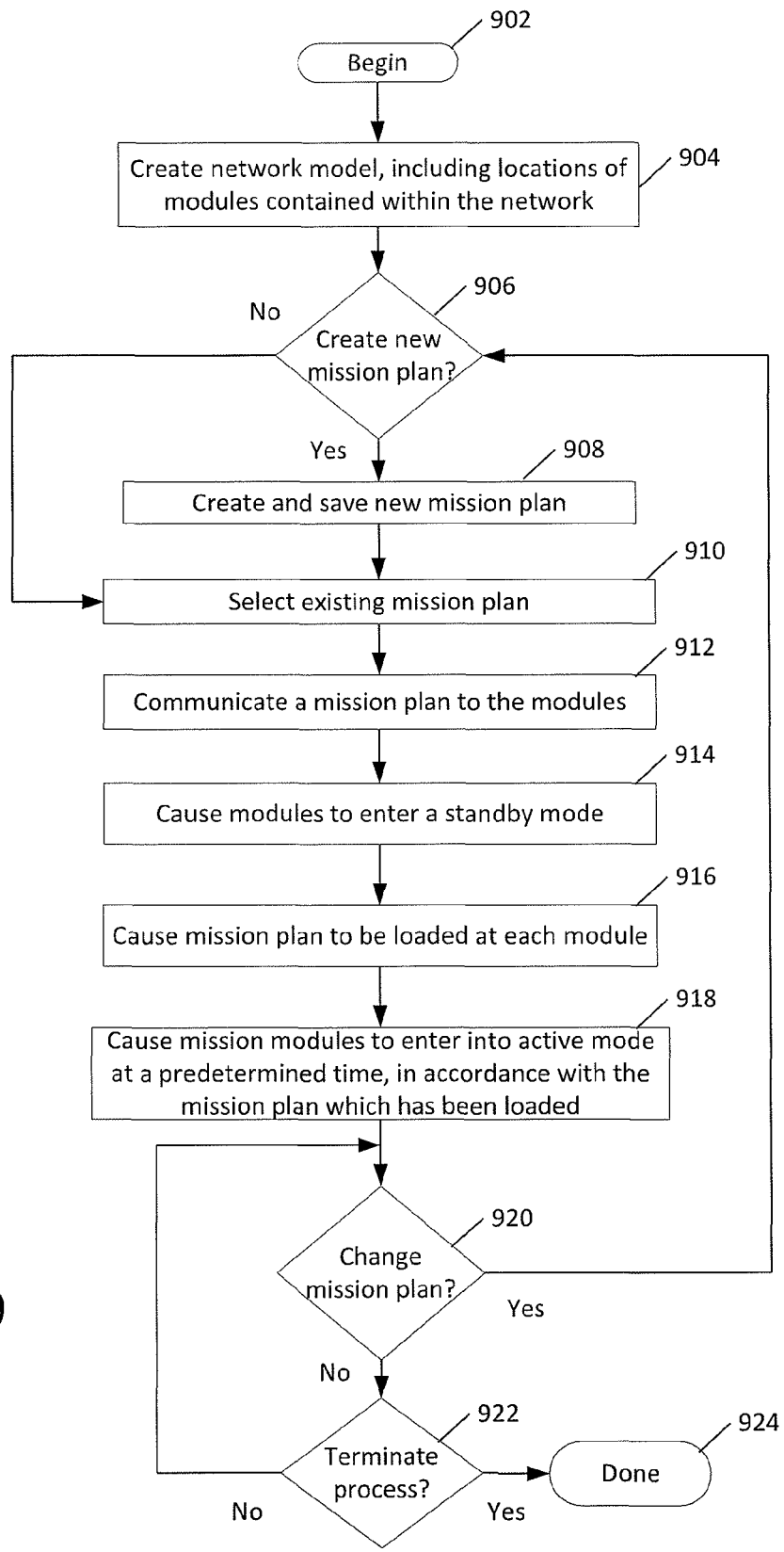
FIG. 9 is a flowchart that is useful for understanding the operation of a network control software application (NCSA) in relation to creating and loading mission plans.

Referring now to FIG. 9, there is provided a flowchart which summarizes the methods described herein for managing a dynamic computer network. The process begins in step 902 and continues to step 904, where a network model is created (e.g., as shown and described in relation to FIG. 3). In step 906, a determination is made as to whether a new mission plan is to be created. If so, a new mission plan is created in step 908 and the process continues to step 910, where the new mission plan is selected. Alternatively, if in step 906 a desired mission plan has already been created, then the method can continue directly to step 910 where an existing mission plan is selected. In step 912, the mission plan is communicated to the modules (e.g., modules 105-107, 113, 114), where the mission plan is stored in a memory location. When the network administrator is ready to implement the new mission model, a command is sent in step 914 which causes the modules to enter a standby mode as described herein. While the modules are in this standby mode, the mission plan is loaded at step 916. Loading of the mission plan occurs at each module so that the mission plan can be used to control the operations of an application software executing on the module. In particular, the mission plan is used to control the way in which the application software performs dynamic manipulations of identity parameters. In step 918, the mission modules are again caused to enter into an active operational mode in which each mission module performs manipulations of identity parameters in accordance with the mission plan. Steps 914, 916, and 918 can occur in response to specific commands sent from a network administrator, or can occur automatically at each module in response to receiving the mission plan in step 912. After step 918, the modules continue performing processing in accordance with the mission plan which has been loaded. In step 920, the process continues by checking to determine if the user has indicated a desired to change the mission plan; if so, the process returns to step 906, where the it continues as described above. If there is no indication that the user or network administrator wishes to change an existing mission plan, then the process determines in step 922 whether it has been instructed to terminate. If so, the process terminate in step 924. If no termination instruction is received, the process returns to step 920 and continues.

Figure 10:
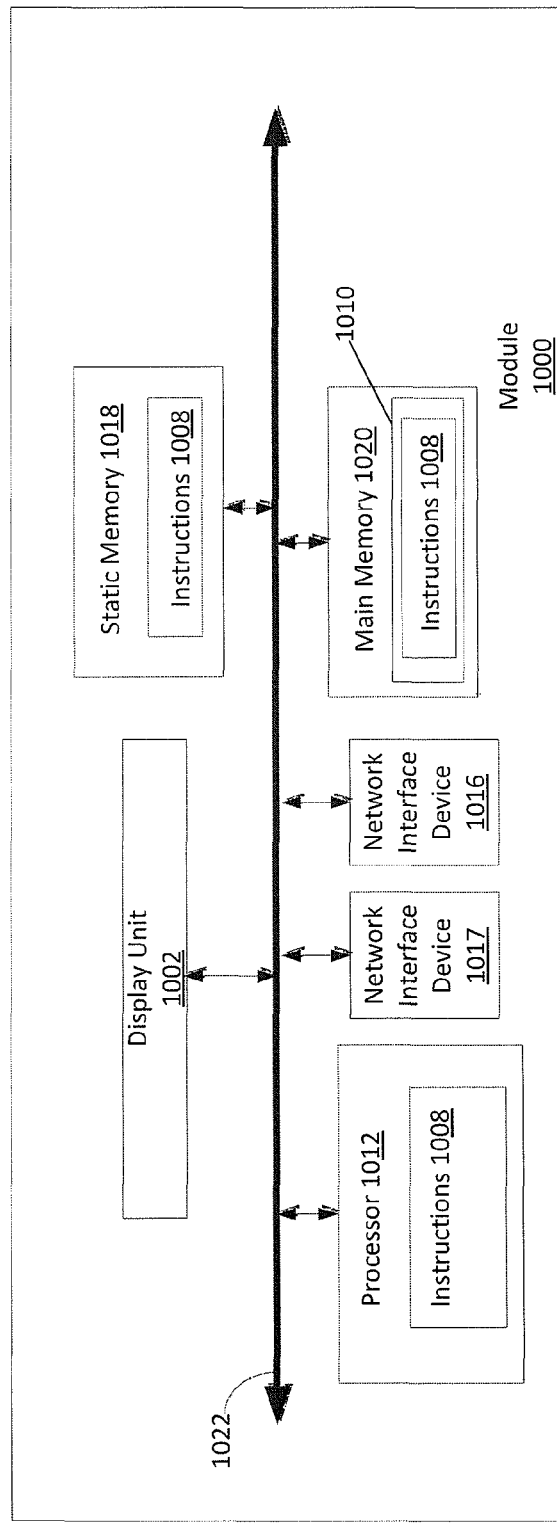
FIG. 10 is a block diagram of a computer architecture that can be used to implement the modules in FIG. 1.

Referring now to FIG. 10, there is provided a block diagram which shows a computer architecture of an exemplary module 1000 which can be used for performing the manipulation of identity parameters described herein. The module 1000 includes a processor 1012 (such as a central processing unit (CPU), a main memory 1020 and a static memory 1018, which communicate with each other via a bus 1022. The computer system 1000 can further include a display unit 1002, such as a liquid crystal display or LCD to indicate the status of the module. The module 1000 can also include one or more network interface devices 1016, 1017 which allow the module to receive and transmit data concurrently on two separate data lines. The two network interface ports facilitate the arrangement shown in FIG. 1, where each module is configured to concurrently intercept and re-transmit data packets received from two separate computing devices on the network.

The main memory 1020 includes a computer-readable storage medium 1010 on which is stored one or more sets of instructions 1008 (e.g., software code) configured to implement one or more of the methodologies, procedures, or functions described herein. The instructions 1008 can also reside, completely or at least partially, within the static memory 1018, and/or within the processor 1012 during execution thereof by the module. The static memory 1018 and the processor 1012 also can constitute machine-readable media. In the various embodiments of the present invention a network interface device 1016 connected to a network environment communicates over the network using the instructions 1008.

Figure 11:
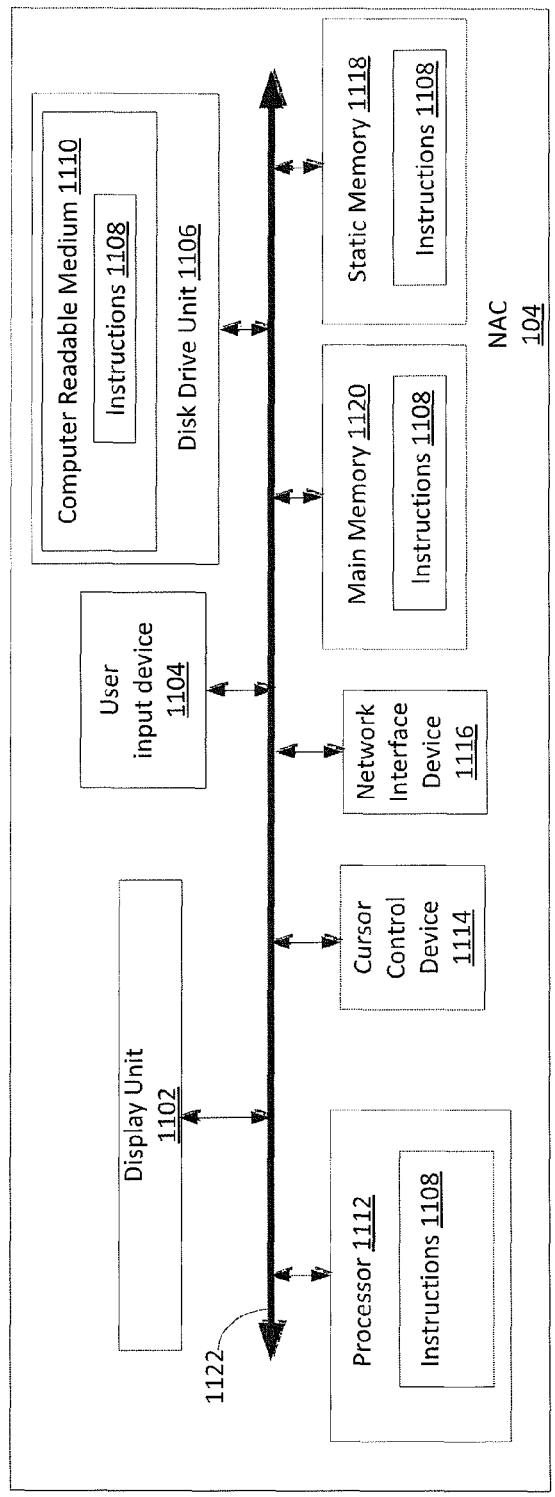
FIG. 11 is a block diagram of a computer architecture that can be used to implement the network administration computer (NAC) in FIG. 1.

Referring now to FIG. 11, there is shown an exemplary network administration computer (NAC) 114 in accordance with the inventive arrangements. The NAC can comprise various types of computing systems and devices, including a server computer, a client user computer, a personal computer (PC), a tablet PC, a laptop computer, a desktop computer, a control system or any other device capable of executing a set of instructions (sequential or otherwise) that specifies actions to be taken by that device. Further, while a single computer is illustrated in FIG. 11, the phrase "NAC" shall be understood to include any collection of computing devices that individually or jointly execute a set (or multiple sets) of instructions to perform any one or more of the methodologies discussed herein.

Referring now to FIG. 11, the NAC 104 includes a processor 1112 (such as a central processing unit (CPU), a disk drive unit 1106, a main memory 1120 and a static memory 1118, which communicate with each other via a bus 1122. The NAC 104 can further include a display unit 1102, such as a video display (e.g., a liquid crystal display or LCD), a flat panel, a solid state display, or a cathode ray tube (CRT)). The NAC 104 can include a user input device 1104 (e.g., a keyboard), a cursor control device 1114 (e.g., a mouse) and a network interface device 1116.

The disk drive unit 1106 includes a computer-readable storage medium 1110 on which is stored one or more sets of instructions 1108 (e.g., software code) configured to implement one or more of the methodologies, procedures, or functions described herein. The instructions 1108 can also reside, completely or at least partially, within the main memory 1120, the static memory 1118, and/or within the processor 1112 during execution thereof. The main memory 1120 and the processor 1112 also can constitute machine-readable media.

Those skilled in the art will appreciate that the module architecture illustrated in FIG. 10, and the NAC architecture in FIG. 11, each represent merely one possible example of a computing device that can be used respectively for performing the methods described herein. However, the invention is not limited in this regard and any other suitable computing device architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware devices with related control and data signals communicated between and through the modules, or as portions of an application-specific integrated circuit. Thus, the exemplary system is applicable to software, firmware, and hardware implementations.

In accordance with various embodiments of the present invention, the methods described herein are stored as software programs in a computer-readable storage medium and are configured for running on a computer processor. Furthermore, software implementations can include, but are not limited to, distributed processing, component/object distributed processing, parallel processing, virtual machine processing, which can also be constructed to implement the methods described herein.

While the computer-readable storage medium 1010, 1110 is shown in FIGS. 10 and 11 to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but is not be limited to, solid-state memories such as a memory card or other package that houses one or more read-only (non-volatile) memories, random access memories, or other re-writable (volatile) memories; magneto-optical or optical mediums such as a disk or tape. Accordingly, the disclosure is considered to include any one or more of a computer-readable medium as listed herein and to include recognized equivalents and successor media, in which the software implementations herein are stored.

Communications With Computing Devices Outside the Dynamic Network

While the methods described herein for dynamic manipulation of identity parameters can work well within a network 100, they do present some problems for communicating with computers outside the network 100. For example, computers outside of the network 100 will not be aware of the dynamic processes at work for manipulating identity parameters. Accordingly, communications with computers outside the network 100 are likely to be disrupted if appropriate actions are not taken. Accordingly, the network 100 advantageously includes at least one bridge 115 which is arranged to process communications entering or leaving the network 100. The bridge ensures that such communications between computing devices within the network 100 and computing devices outside the network 100 can occur without errors.

The bridge 115 is a computing device that will have a functional block diagram that is similar to that of a module as shown in FIG. 2. The bridge 115 can also have a computer architecture that is similar to that which is shown in FIG. 10. The operations performed by the bridge 115 are similar to those performed by the modules 105-107, 113, 114. The bridge will receive data communications from network 100 and will manipulate identity parameters in accordance with a mission plan before re-transmitting such data communications to a second network 124. In some embodiments, such manipulations will involve conversion of false identity parameters back to true identity parameters, where the true identity parameters are determined based on information contained in the mission plan. Such an arrangement is sufficient where the second network does not dynamically modify identity parameter information.

In an alternative embodiment, the second network 124 is a dynamic network that operates in a manner similar to the network 100. As such, the second network may have its own mission plan (second mission plan). In that case, the bridge will receive identity parameters in a data communication from the first network, and will transform a first set of those identity parameters having false values to instead have true values. The mission plan for the second network 124 can specify an entirely different dynamic network. For example, the mission plan for the second network can specify different identity parameters to be modified, different trigger timing, and so on. Accordingly, the bridge will need to receive a message from the first network, correct the false values in the first set in accordance with the mission plan of the first network 100, and then dynamically modify the same (or different) identity parameters in a second set in accordance with the mission plan of the second network. Once the second set of identity parameters has been properly converted to false values, the data communication is transmitted to the second network.

It will be appreciated that the first set is determined in accordance with a first mission plan associated with the first network, and the second set is determined in accordance with a second mission plan associated with the second network. Similarly, the false information contained in said first set is determined in accordance with first mission plan and the false information contained in the second set is determined in accordance with the second mission plan. The first set of identity parameters can be the same or different as compared to the second set of identity parameters. Also, it should be appreciated that the first and second set can include all or some of the identity parameters included in the data communication. The data communication will generally be a packet data communication containing a plurality of identity parameters. The bridge will also receive data communications from second network 124, and will manipulate the identity parameters in such data communications in accordance with the mission plan of the first network, the second network or both. For example, the bridge can receive a second data communication from the second data network, which can include a second plurality of identity parameters. The second identity parameters may or may not specify false information, depending on whether the second network dynamically modifies identity parameters. If the second network does not dynamically modify identity parameters, then the bridge only needs to use the mission plan associated with the first network to dynamically transform a set of the second plurality of identity parameters to specify false information.

If the second network does dynamically modify identity parameters, then the bridge will need to use the mission plan associated with the second network to convert a first set of the second plurality of identity parameters (having false values) to true values. This step is preferably performed before the bridge uses the mission plan associated with the first network to transform a second set of the second plurality of identity parameters to false values. The first and second set can be the same or different, and will be determined in each case by the mission plan for each network. Likewise, the transformations performed to convert identity parameters to false values can be the same or different, and will depend on the mission plan associated with each network. Thereafter, the bridge will re-transmit such data communications to the network 100.

In some embodiments, the false identity parameters for network 100, 124 are determined in accordance with a pseudorandom process. In that case, the pseudorandom process and/or the seed values for the pseudorandom process can be determined by the mission plan for the associated network. Likewise, the selection of identity parameters to be manipulated can be determined by a pseudorandom process, where the process and/or the seed values for such process are respectively determined by the mission plan associated with each network. The bridge will make changes to the false identity parameter values and/or the selection of identity parameters to be manipulated in accordance with the occurrence of one or more trigger event as described above with reference to the modules. Unlike the modules, the bridge 115 will need to perform such actions with respect to trigger events occurring with respect to the first and second networks.

Aside from the need to potentially manage dynamic operations associated with more than one mission plan, the operation of the bridge 115 is similar to that of the modules. Still, it should be appreciated that the operations of the bridge 115 is different as compared to the operation of the modules 105-107, 113, 114. For example, unlike the modules, the location where identity parameter manipulations are performed does not change in the case of the bridge 115. Instead, bridge 115 will always be in the active mode when at least one module in the network 100 is in the active mode, since the bridge forms a link with computing devices outside the network 100.

Figure 12:
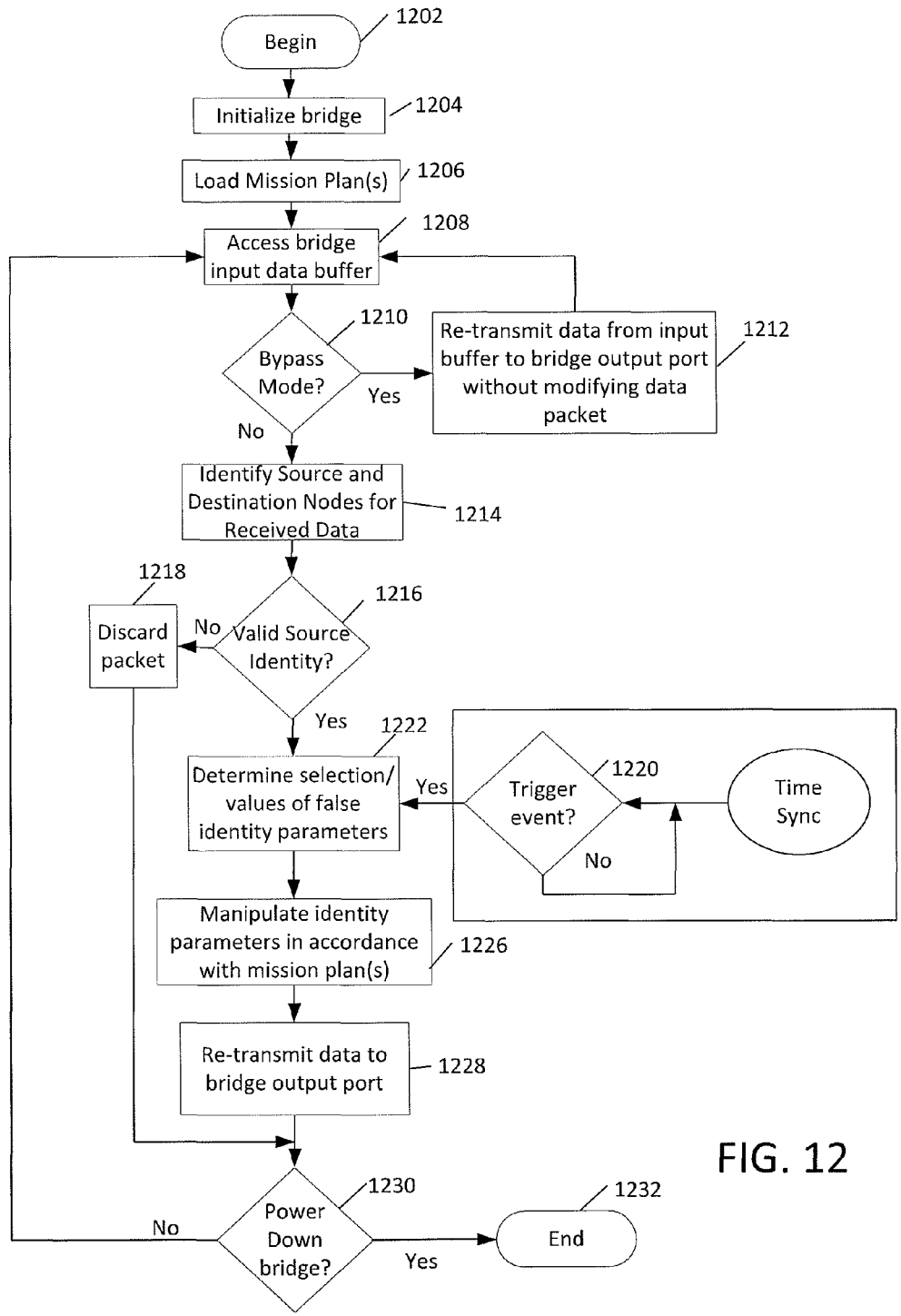
FIG. 12 is a flowchart that is useful for understanding the operation of a bridge in FIG. 1.

Referring now to FIG. 12, there is provided a flowchart which summarizes the operation of bridge 115. The process begins at step 1202 when the bridge is powered up and continues to step 1204 where bridge application software is initialized for executing the methods described herein. In step 1206, one or more mission plans are loaded from a memory location within the bridge. If the bridge is connected to a network that does not engage in dynamic manipulation of identity parameters, then only a single mission plan is needed. However, if the bridge connects two or more networks that each dynamic modification of identity parameters as described herein, then more than one mission plan will be loaded in step 1206. A first mission plan can define a dynamic maneuvering of a first network and a second mission plan can define a dynamic maneuvering of a second network. At this point, the bridge is ready to begin processing data and proceeds to do so at step 1208, where it accesses a data packet from an input data buffer of the bridge. In step 1210, the bridge checks to determine if it is in a bypass mode of operation. If so, the data packet accessed in step 1208 is retransmitted in step 1212 without any modification of the data packet. If the bridge is not in bypass mode, then it must be in its active mode of operation and continues on to step 1214.

In step 1214, the bridge reads the data packet to determine the identity of a source node from which the data packet originated, and the destination node. In step 1216, the bridge examines the data packet to determine if the source node valid. This can be accomplished by comparing the source node specified in the data packet to a current list of valid source nodes. If source node information is not valid then the packet is discarded in step 1218. In step 1220 the process checks to determine if a trigger event has occurred. This is an important step because the occurrence of a trigger event can have a significant effect upon the calculation of proper false identify values. If the bridge is using two or more mission plans, this step includes determining whether trigger events have occurred with respect to either mission plan. Notably, each mission plan can involve different trigger events.

The source and destination address information of the received data is important because it is needed to permit the bridge to determine how to properly manipulate the identity parameters contained within the data communication. Once this information has been determined, the bridge then continues to step 1222 where it determines a selection/values of false identity parameters. The process then continues on to step 1226 at which the bridge manipulates identity parameters of the data packet in accordance with one or more mission plans. Once manipulations are complete, the data packet is re-transmitted at 1228 to an adjacent node from the output port of the bridge. In step 1230, a determination is made as to whether the bridge has been commanded to power down. If so, the process ends at step 1232; otherwise, the process returns to 1208. In step 1208 the process continues and the next data packet is accessed from the bridge's input data buffer. As explained above, the type of manipulations performed at step 1216 will depend upon the source and destination of the data communications, and whether there is one, or more than one, networks that are being dynamically maneuvered.

Types of Identity Parameters that can be Varied

Referring now to FIG. 13, there is provided a list of various identity parameters that can be manipulated in accordance with the inventive arrangements. The list is not intended to be exclusive and other identity parameters can also be manipulated without limitation. A brief discussion Referring now to FIG. 13, there is provided a list of some of the identity parameters that can be manipulated by the modules 105-107, 113, 114 and/or by bridge 115. Each of the parameters listed in FIG. 13 is included in a data communication included in a network using a TCP/IP communication protocol. Most of the information types listed in FIG. 13 are well known to those skilled in the art. However, a brief description of each type of information and its use as an identity parameter is provided herein. Also provided is a brief discussion of the ways in which each identity parameter can be manipulated.

IP Address. An IP Address is a numerical identifier assigned to each computing device participating in a computer network where the network uses the well known Internet Protocol for communication. The IP address can be a 32 bit or 128 bit number. For purposes of the present invention, the IP address number can be changed to a false value that is selected randomly (e.g. using a pseudorandom number generator). Alternatively, the false IP address value can be randomly selected from a predetermined list of false values (e.g. a list specified by a mission plan). The source and destination IP addresses are included in TCP header portion of a data packet. Accordingly, manipulation of these values is performed by simply changing by using packet manipulation techniques which change the IP header information. When the packet arrives at a second module (the location of which can be manipulated), the false IP address values are transformed back to their true values. The second module uses the same pseudorandom process (or its inverse) to derive the true IP address value based on the false value.

MAC Address. A MAC address is a unique value assigned to a network interface device by a manufacturer and stored in an onboard ROM. For purposes of the present invention, the source and/or destination MAC address can be changed to a false value that is selected randomly (e.g. using a pseudorandom number generator). Alternatively, the false MAC value can be randomly selected from a predetermined list of false values (e.g. a list specified by a mission plan). The source and destination MAC addresses are included in IP header portion of data packet. Accordingly, manipulation of these values is performed by simply changing an Ethernet header information of each packet. When the packet arrives at a second module (the location of which can be manipulated), the false MAC address values are transformed back to their true values. A module receiving a packet will use the same pseudorandom process (or its inverse) to derive the true MAC address value based on the false value.

Network/Subnet. In some embodiments, the IP address can be thought of as a single identity parameter. However, an IP address is generally defined as including at least two parts which include a network prefix portion and a host number portion. The network prefix portion identifies a network to which a data packet is to be communicated. The host number identifies the particular node within a Local Area Network (LAN). A sub-network (sometimes referred to as a subnet) is a logical portion of an IP network. Where a network is divided into two or more sub-networks, a portion of the host number section of the IP address is used to specify a subnet number. For purposes of the present invention, the network prefix, the subnet number and the host number can each be considered to be a separate identity parameter. Accordingly, each of these identity parameters can be separately manipulated independently of the others in a pseudorandom way. Moreover, it will be appreciated that a data packet will include a source IP address and a destination IP address. Accordingly, the network prefix, the subnet number and host number can be manipulated in the source IP address and/or the destination IP address, for a total of six different variable identity parameters that can be manipulated in a pseudorandom way. A module receiving a packet will use the same pseudorandom process as an originating node (or the inverse of such process) to derive the true Network/subnet information value based on the false value.

TCP Sequence. Two client computers communicating with each other on opposite sides of a TCP session will each maintain a TCP sequence number. The sequence number allows each computer to track how much data it has communicated. The TCP sequence number is included in the TCP header portion of each packet which is communicated during the session. At the initiation of a TCP session, the initial sequence number value is randomly selected. For purposes of the present invention, the TCP sequence number can be manipulated as an identity parameter in accordance with a pseudorandom process. For example, the TCP sequence number can be changed to a false value that is selected randomly (e.g. using a pseudorandom number generator). When the packet is received at a different module of the network (the location of which will be dynamically varied), the TCP sequence number can be transformed from a false value back to a true value, using an inverse of the pseudorandom process.

Port Number. A TCP/IP port number is included in the TCP or UDP header portion of a data packet. Ports as used in the TCP/IP communication protocol are well known in the art and therefore will not be described herein in detail. The port information is contained within the TCP header portion of the data packet. Accordingly, manipulation of the port information is accomplished by simply modifying the TCP header information to change a true port value to a false port value. As with the other identity parameters discussed here, the port number information can be manipulated or transformed to a false value in accordance with a pseudorandom process at a first module. The port information can later be transformed from a false value to a true value at a second module, using an inverse of the pseudorandom process.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

I claim:

1. A method for communicating data from a first computing device included in a first computer network, to a second computing device included in a second computer network, comprising:

transmitting a data communication on said first computer network, said data communication including a first plurality of identity parameters which specify true values associated with at least one of said first and second computing devices;

dynamically modifying a first set of said first plurality of identity parameters at a first location in said first computer network, to transform said first set to specify false information before re-transmitting said data communication to a bridge location, said false information specifying identity parameter data which is observable by an adversary monitoring said network, but specifying incorrect information with respect to at least one of said first and second computing devices;

dynamically modifying said first set at said bridge location to transform said first set to specify true information;

after transforming said first set to specify true information at said bridge location, transmitting said data communication from said bridge location to said second computer network;

detecting a trigger event for causing a dynamic variation in a position of said first location within the first computer network: and in response to detection of the trigger event, dynamically varying a position of said first location within the first computer network by using a pseudorandom function so as to vary a distance vector between said first location and said bridge location, where a seed value for the pseudorandom function comprises an occurrence time of the trigger event.

2. The method according to claim 1, wherein said second computer network does not dynamically modify identity parameters, and said data communication is transmitted from said bridge to said second network with all of said first plurality of identity parameters containing true information.

3. The method according to claim 1, wherein said second computer network dynamically modifies identity parameters, and said method further comprises dynamically modifying at said bridge location a second set of said plurality of identity parameters, to transform said second set to specify false information.

4. The method according to claim 3, wherein said first set is determined in accordance with a first mission plan and said second set is determined in accordance with a second mission plan.

5. The method according to claim 4, wherein the false information contained in said first set is determined in accordance with said first mission plan and said false information contained in said second set is determined in accordance with the second mission plan.

6. The method according to claim 4, wherein said first set is different from said second set.

7. The method according to claim 1, further comprising:

receiving at said bridge location a second data communication from said second computing device of said second computer network containing a second plurality of identity parameters associated with at least one of said first and second computing devices;

dynamically modifying a first set of said second plurality of identity parameters at said bridge location to transform said first set of said second plurality of identity parameters to specify false information; and after transforming said first set of said second plurality of identity parameters to specify false information, transmitting said data communication from said bridge location to said first computer network.

8. The method according to claim 7, wherein all of said second plurality of identity parameter values specify true information when said second data communication is received from said second computer network.

9. The method according to claim 7, wherein a second set of said second plurality of identity parameter values specify false information when said second data communication is received by said bridge, and further comprising transforming said second set of said second plurality of identity parameters to specify true information before transforming said first set of said second plurality of identity parameters to specify false information.

10. The method according to claim 7, further comprising dynamically modifying said first set of said second plurality of identity parameters at a third location in said first computer network to specify true information.

11. The method according to claim 10, further comprising dynamically varying a position of said third location within the first computer network.

12. The method according to claim 1, further comprising determining the occurrence of said trigger event based on at least one of a user command, a timing interval, and a detection of a potential network security threat.

13. The method according to claim 1, wherein said trigger event is determined in accordance with said first mission plan.

14. A bridge for communicating data between a first computing device included in a first computer network and a second computing device included in a second computer network, where the data includes a plurality of identity parameters values which are used to convey information concerning at least one of the first computing device and the second computing device, comprising:

at least one computer processing device configured to:

selectively perform a first transformation in which a first set of identity parameter values in a first data communication from said first computing device to said second computing device, are transformed from values that are false to values that are true, said false values specifying identity parameter data which is observable by an adversary monitoring said network, but specifying incorrect information with respect to at least one of said first and second computing devices;

dynamically determine at least one characteristic of said first transformation in coordination with a plurality of modules in said first computer network: and detect a first trigger event for causing a dynamic variation in a position of said first location within the first computer network:

wherein said at least one characteristic is determined in accordance with a first mission plan associated with said first computer network and said mission plan further specifies dynamically varying locations within said first network where said first set of identity parameters are converted from values that are true to values that are false by using a pseudorandom function so as to vary a distance vector between said first computing device and said second computing device, where a seed value for the pseudorandom function comprises an occurrence time of the first trigger event.

15. The bridge according to claim 14, wherein said locations correspond to locations of modules in said first computer network where said first set of identity parameters are converted from values that are true to values that are false.

16. The bridge according to claim 14, wherein said characteristic is selected from the group consisting of a determination of said identity parameters to be included in said first set, and a correspondence between said values that are false and said values that are true.

17. The bridge according to claim 14, wherein said computer processing device is further configured to selectively perform a second transformation in which a second set of identity parameter values in said first data communication, are transformed from values that are true to values that are false.

18. The bridge according to claim 17, wherein said computer processing device is further configured to dynamically determine at least one characteristic of said second transformation in coordination with a plurality of modules in said second computer network.

19. The bridge according to claim 18, wherein said at least one characteristic of said second transformation is selected from the group consisting of a determination of said identity parameters to be included in said second set, and a correspondence between values that are true and values that are false.

20. The bridge according to claim 17, wherein said first transformation is performed in accordance with a first mission plan associated with said first computer network, and said second transformation is performed in accordance with a second mission plan associated with said second computer network.

21. The bridge according to claim 20, wherein one or more of said modules in said second computer network are configured to convert said second set of identity parameters from values that are false to values that are true in accordance with said second mission plan.

22. The bridge according to claim 17, wherein said first set is different than said second set.

23. The bridge according to claim 14, wherein said computer processing device is further configured to selectively modify said at least one characteristic in accordance with at least one second trigger event.

24. The bridge according to claim 23, wherein said second trigger event is at least one of a user command, a timing interval, and a detection of a potential network security threat.

25. The method according to claim 23, wherein said second trigger event is determined in accordance with said first mission plan.

\* \* \* \* \*